United States Patent
Azenkot et al.

(10) Patent No.: US 9,244,612 B1
(45) Date of Patent: Jan. 26, 2016

(54) KEY SELECTION OF A GRAPHICAL KEYBOARD BASED ON USER INPUT POSTURE

(71) Applicant: Google Inc., Mountain View, CA (US)

(72) Inventors: Shiri Azenkot, San Jose, CA (US); Shumin Zhai, Los Altos, CA (US); Ciprian Ioan Chelba, Palo Alto, CA (US); Yu Ouyang, San Jose, CA (US)

(73) Assignee: Google Inc., Mountain View, CA (US)

( * ) Notice: Subject to any disclaimer, the term of this patent is extended or adjusted under 35 U.S.C. 154(b) by 204 days.

(21) Appl. No.: 13/769,094

(22) Filed: Feb. 15, 2013

Related U.S. Application Data

(60) Provisional application No. 61/599,829, filed on Feb. 16, 2012.

(51) Int. Cl.
G06F 3/041 (2006.01)
G06F 3/0489 (2013.01)

(52) U.S. Cl.
CPC .............. *G06F 3/0489* (2013.01); *G06F 3/041* (2013.01)

(58) Field of Classification Search
CPC  G06F 3/0488; G06F 3/04883; G06F 3/04886
USPC ........................................................ 715/773
See application file for complete search history.

(56) References Cited

U.S. PATENT DOCUMENTS

| | | |
|---|---|---|
| 5,075,896 A | 12/1991 | Wilcox et al. |
| 5,801,941 A * | 9/1998 | Bertram ........................... 700/83 |
| 6,286,064 B1 | 9/2001 | King et al. |
| 6,292,179 B1 | 9/2001 | Lee |
| 6,542,170 B1 | 4/2003 | Williams et al. |
| 6,801,190 B1 | 10/2004 | Robinson et al. |
| 6,983,247 B2 | 1/2006 | Ringger et al. |
| 7,030,863 B2 | 4/2006 | Longe et al. |
| 7,042,443 B2 | 5/2006 | Woodard et al. |
| 7,075,520 B2 | 7/2006 | Williams |
| 7,088,345 B2 | 8/2006 | Robinson et al. |
| 7,098,896 B2 | 8/2006 | Kushler et al. |
| 7,145,554 B2 | 12/2006 | Bachmann |
| 7,151,530 B2 | 12/2006 | Roeber et al. |
| 7,199,786 B2 | 4/2007 | Suraqui |

(Continued)

OTHER PUBLICATIONS

Goodman et al., "Language Modeling for Soft Keyboards," In proceedings of hte 7th International Conference on Intelligent User Interfaces, Jan. 13-16, 2002, pp. 194-195.*

(Continued)

*Primary Examiner* — Doon Chow
*Assistant Examiner* — James T Tsai
(74) *Attorney, Agent, or Firm* — Shumaker & Sieffert, P.A.

(57) ABSTRACT

In one example, a method includes outputting, by a computing device and for display, a graphical keyboard comprising a plurality of keys, and receiving, by the computing device, an indication of a gesture detected at a presence-sensitive input device. The method further includes determining, by the computing device, an input posture of the gesture at the presence-sensitive input device, and applying, by the computing device and based at least in part on the input posture, at least one offset to a location associated with a key from the plurality of keys to determine an offset location associated with the key, and in response to receiving the indication of the gesture, selecting, by the computing device and based at least in part on the offset location, the key as a selected key.

20 Claims, 10 Drawing Sheets

(56) References Cited

U.S. PATENT DOCUMENTS

| | | | |
|---|---|---|---|
| 7,250,938 | B2 | 7/2007 | Kirkland et al. |
| 7,251,367 | B2 | 7/2007 | Zhai |
| 7,277,088 | B2 | 10/2007 | Robinson et al. |
| 7,453,439 | B1 | 11/2008 | Kushler et al. |
| 7,508,324 | B2* | 3/2009 | Suraqui .................... 345/173 |
| 7,706,616 | B2 | 4/2010 | Kristensson et al. |
| 7,716,579 | B2 | 5/2010 | Gunn et al. |
| 7,750,891 | B2 | 7/2010 | Stephanick et al. |
| 7,809,719 | B2 | 10/2010 | Furuuchi et al. |
| 7,880,730 | B2 | 2/2011 | Robinson et al. |
| 7,886,233 | B2 | 2/2011 | Rainisto et al. |
| 7,921,361 | B2 | 4/2011 | Gunn et al. |
| 8,036,878 | B2 | 10/2011 | Assadollahi |
| 8,135,582 | B2 | 3/2012 | Suraqui |
| 8,928,593 | B2* | 1/2015 | Jian .................... 345/169 |
| 2005/0171783 | A1 | 8/2005 | Suominen |
| 2006/0119582 | A1 | 6/2006 | Ng et al. |
| 2006/0173674 | A1 | 8/2006 | Nakajima et al. |
| 2006/0176283 | A1 | 8/2006 | Suraqui |
| 2008/0316183 | A1 | 12/2008 | Westerman et al. |
| 2009/0007001 | A1* | 1/2009 | Morin et al. .................... 715/773 |
| 2009/0231282 | A1* | 9/2009 | Fyke .................... 345/173 |
| 2010/0131447 | A1 | 5/2010 | Creutz et al. |
| 2010/0289752 | A1* | 11/2010 | Birkler .................... 345/173 |
| 2010/0315266 | A1 | 12/2010 | Gunawardana et al. |
| 2011/0063231 | A1 | 3/2011 | Jakobs et al. |
| 2011/0128230 | A1* | 6/2011 | Griffin .................... 345/169 |
| 2012/0036469 | A1 | 2/2012 | Suraqui |
| 2012/0154298 | A1* | 6/2012 | Wu et al. .................... 345/173 |
| 2012/0166995 | A1 | 6/2012 | McAleer |
| 2012/0260207 | A1* | 10/2012 | Treskunov et al. ............ 715/773 |
| 2012/0324381 | A1* | 12/2012 | Cohen et al. .................... 715/765 |
| 2013/0002565 | A1* | 1/2013 | Tumanov et al. ............ 345/173 |
| 2013/0009896 | A1* | 1/2013 | Zaliva .................... 345/173 |
| 2013/0067382 | A1* | 3/2013 | Townsend et al. ............ 715/773 |
| 2013/0222247 | A1* | 8/2013 | Liu et al. .................... 345/168 |

OTHER PUBLICATIONS

Henze et al., "100,000,000 Taps: Analysis and Improvement of Touch Performance in the Large", MobileHCI 2011, 10 pgs.

U.S. Appl. No. 60/430,338, by Daniel Suraqui, filed Nov. 29, 2002.

U.S. Appl. No. 60/505,724, by Daniel Suraqui, filed Sep. 22, 2003.

Lomas, "Hey Apple, What the Next iPhone Really, Really Needs Is a Much Better Keyboard," Retrieved from techcrunch.com/2013/04/21/the-iphone-keyboard-stinks/?, Apr. 22, 2013. 6 pp.

Findlater et al., "From Plastics to Pixels: In Search of Touch-Typing Touchscreen Keyboards," Interactions, May-Jun. 2012, pp. 44-49.

Findlater, et al., "In Search of Touch-Typing Touchscreen Keyboards," College of Information Studies, University of Maryland, College Park, accessed on Aug. 22, 2012, 36 pp.

Himberg et al., "On-line Personalization of a Touch Screen Based Keyboard," In proceedings of 8th International Conference on Intelligent user inter faces, IUI, 2003, ACM (2003), pp. 77-84.

Shahbudin et al. "Adaptive-Neuro Fuzzy Inference for Human Posture Classification Using a Simplified Shock Graph," ACM DL Digital Library, (Absract only), 2009 2 pp.

Goel et al., "Walk Type: Using Accelerometer Data to Accommodate Situational Impairments in Mobile Touch Screen Text Entry," CHI 2012, May 5-10, 2012, Austin, Texas, USA, pp. 2687-2696.

Findlater et al., "Personalized Input: Improving Ten-Finger Touchscreen Typing Through Automatic Adaptation," CHI 2012, May 5-10, 2012, Austin Texas, USA, pp. 815-824.

Findlater et al., "Personalized Input Improving Ten-Finger Touchscreen Typing Through Automatic Adaptation," May 2012, 46 pp.

Azenkot et al., "Touch Behavior with Different Postures on Soft Smartphone Keyboards," In proceedings of Mobile HCI, 2012, 10 pp.

Faraj et al., "A Virtual Keyboard for Mobile Devices," In Human-Computer Interaction, Ambient Ubiquitous and Intelligent Interaction, J. Jacko, Ed., vol. 5612, 2009, pp. 3-10 (Abstract only).

Aulagner et al., "FloodKey: increasing software keyboard keys by reducing needless ones without occultation," In Proceedings of the 10th WSEAS international conference on Applied Computer Science, ACS, 2010, pp. 412-417.

Goodman et al., "Language Modeling for Soft Keyboards," In Proceedings of the 7th International Conference on Intelligent User Interfaces, Jan. 13-16, 2002, pp. 194-195.

Gunawardana et al., "Usability Guided Key-Target Resizing for Soft Keyboards," In Proceedings of the 15th international Conference on Intelligent User interfaces, ACM, 2010, pp. 111-118.

Hoggan et al., "Investigating the Effectiveness of Tactile Feedback for Mobile Touchscreens," Proceedings of the twenty-sixth annual SIGCHI Conference on Human Factors in Computing Systems, CHI, Apr. 5-10, 2008, pp. 1573-1582.

Kristensson et al., "Shark$^2$: A Large Vocabulary Shorthand Writing System for Pen-based Computers," UIST, Oct. 24-27, 2004, pp. 43-52.

Kristensson et al., "Relaxing Typing Precision by Geometric Pattern Matching," In Proceedings of the 10th International Conference on Intelligent User Interfaces, IUT, Jan. 9-12, 2005, pp. 151-158.

MacKenzie et al., "The Design and Evaluation of a High-Performance Soft Keyboard," In Proceedings of the SIGHI Conference on Human Factors in Computing Systems: The CHI is the Limit, CHI 1999, pp. 25-31.

Magnien et al., "Mobile Text Input with Soft Keyboards: Optimization by Means of Visual Clues," In Mobile Human-Computer Interaction, Mobile HCI, 2004, vol. 3160, pp. 197-218.

Brewster et al., "Tactile Feedback for Mobile Interactions," Glasgow Interactive Systems Group, Department of Computing Science, CHI 2007, Apr. 28-May 3, 2007, 4 pp.

Rabin et al, "Tactile Feedback Contributes to Consistency of Finger Movements During Typing," Exp Brain Res, Feb. 20, 2004, 8 pages.

Rashid et al, "Relative Keyboard Input System," Proceedings of the 13th International Conference on Intelligent User Interfaces, Jan. 13-16, 2008, 4 pp.

Rudchenko et al., "Text Text Revolution: A Game that Improves Text Entry on Mobile Touchscreen Keyboards," Proceedings of the 9th International Conference on Pervasive Computing, 2011, 8 pp.

Zhai et al., "Movement Model, Hits Distribution and Learning in Virtual Keyboarding," Proceedings of the SIGCHI Conference on Human Factors in Computing Systems, Apr. 20-25, 2002, 8 pp.

Zhai et al., "The Metropolis Keyboard—An Exploration of Quantitative Techniques for Virtual Keyboard Design," Proceedings of the 13th Annual ACM Symposium on User Interface Software and Technology, Nov. 5-8, 2000, 10 pp.

* cited by examiner

KEY SELECTION OF A GRAPHICAL KEYBOARD BASED ON USER INPUT POSTURE

This application claims the benefit of U.S. Provisional Application No. 61/599,829, filed Feb. 16, 2012, the entire content of which is hereby incorporated by reference.

BACKGROUND

Some computing devices (e.g., mobile phones, tablet computers, etc.) may provide a graphical keyboard as part of a graphical user interface for composing text (e.g., using a presence-sensitive input device and/or display, such as a touchscreen). The graphical keyboard may enable a user of the computing device to enter text (e.g., an e-mail, a text message, or a document, etc.). For instance, a display device of a computing device may output a graphical (or "soft") keyboard that enables the user to enter data by indicating (e.g., by tapping) keys displayed at the presence-sensitive display.

In some cases, the computing device may present a graphical keyboard with which the user interacts by tapping individual keys of the keyboard or essentially gesturing out a word by sliding his or her finger over the regions associated with the keys. In this way, graphical keyboards provide an input method that allows the user to enter characters, words, or a group of words by one or more gestures. As such, a graphical keyboard may allow the user to achieve a certain degree of efficiency by quickly and accurately entering text.

However, graphical keyboards have certain drawbacks. For example, a computing device may receive a series of tap gestures or sliding gestures from a user paying little attention to accuracy. The characters inputted by the computing device, though, may be different than the characters that the user attempted to select. Consequently, the user may need to correct the inputted characters. As such, entering text with gestures using a graphical keyboard may be difficult and reduce the speed at which the user may interact with the computing device.

SUMMARY

In one example, a method includes outputting, by a computing device and for display, a graphical keyboard comprising a plurality of keys, receiving, by the computing device, an indication of a gesture detected at a presence-sensitive input device, determining, by the computing device, an input posture of the gesture at the presence-sensitive input device, and applying, by the computing device and based at least in part on the input posture, at least one offset to a location associated with a key from the plurality of keys to determine an offset location associated with the key. The method further includes in response to receiving the indication of the gesture, selecting, by the computing device and based at least in part on the offset location, the key as a selected key.

In another example, a computer-readable storage medium is encoded with instructions that, when executed, cause at least one processor of a computing device to output, for display, a graphical keyboard comprising a plurality of keys, receive an indication of a gesture detected at a presence-sensitive input device, and determine an input posture of the gesture at the presence-sensitive input device. The computer-readable storage medium is further encoded with instructions that, when executed, cause the at least one processor of the computing device to apply, based at least in part on the input posture, at least one offset to a location associated with a key from the plurality of keys to determine an offset location associated with the key, and in response to receiving the indication of the gesture, select, based at least in part on the offset location, the key as a selected key.

In another example, a device includes at least one processor and at least one module operable by the at least one processor to output, for display, a graphical keyboard comprising a plurality of keys, receive an indication of a gesture detected at a presence-sensitive input device, and determine an input posture of the gesture at the presence-sensitive input device. The at least one module is further operable by the at least one processor to apply, based at least in part on the input posture, at least one offset to a location associated with a key from the plurality of keys to determine an offset location associated with the key, and in response to receiving the indication of the gesture, select, based at least in part on the offset location, the key as a selected key.

The details of one or more examples are set forth in the accompanying drawings and the description below. Other features, objects, and advantages will be apparent from the description and drawings, and from the claims.

DETAILED DESCRIPTION

Figure 1:
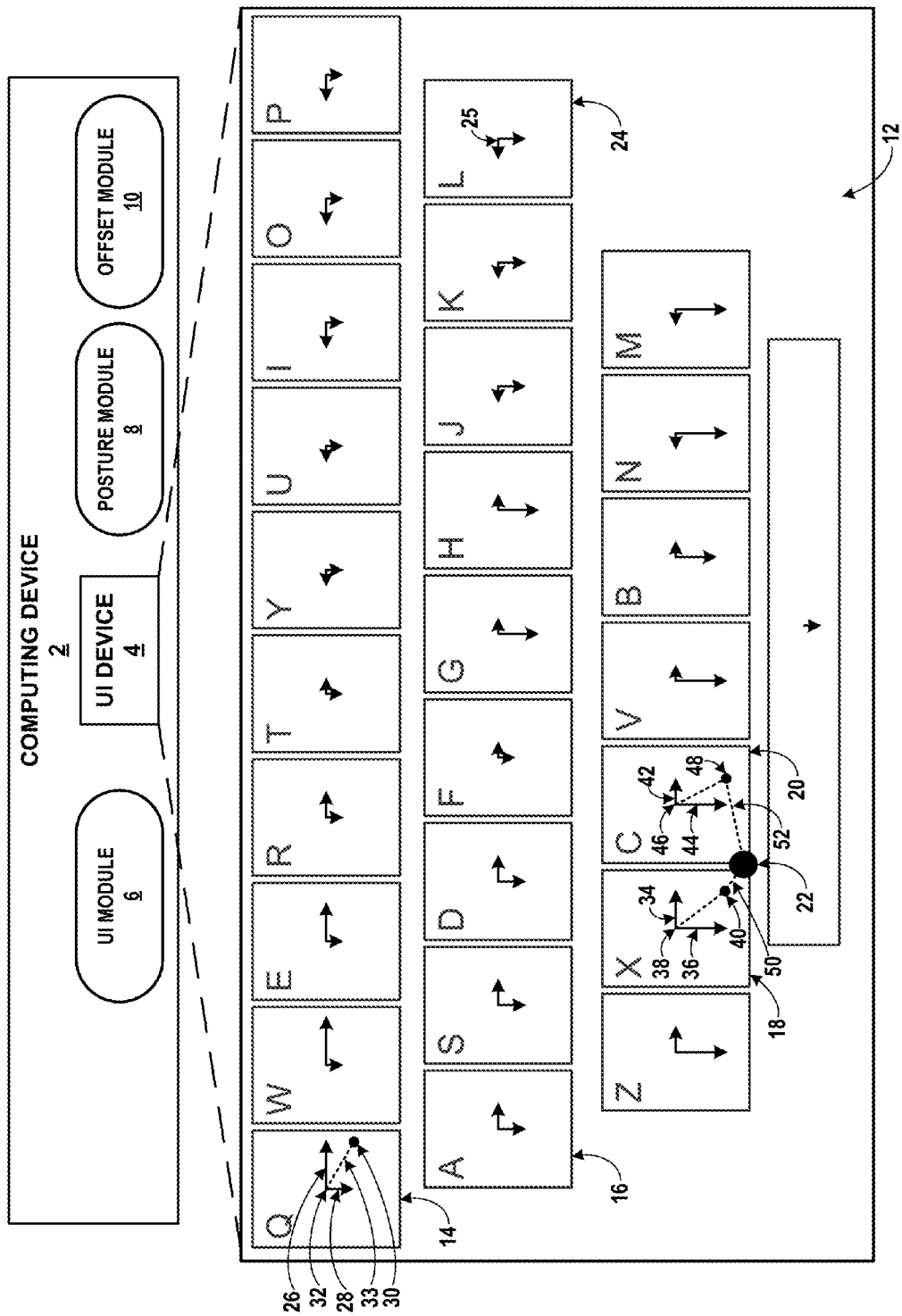
FIG. 1 is a block diagram illustrating an example computing device and graphical keyboard for providing text input, in accordance with one or more aspects of the present disclosure.

In general, this disclosure is directed to techniques for providing improved prediction of key selections of a graphical keyboard based on user input posture. In some examples, a computing device implementing techniques of this disclosure may determine a posture with which a user is selecting keys of a graphical keyboard, e.g., by tapping, gesturing, or otherwise providing input to select one or more keys of the graphical keyboard. As one example, a computing device implementing techniques of this disclosure may determine a single-finger input posture in which a user is holding and/or interacting with a presence-sensitive input device (e.g., a presence-sensitive input device integrated with a computing device, a presence-sensitive input device remote from and operatively coupled to a computing device, etc.) and gesturing with a single finger using an input unit, e.g., a finger or stylus. As another example, a computing device may determine a single-thumb input posture in which a user is interacting with the presence-sensitive input device by providing gesture input with a thumb of a hand (e.g., in some instances, the same hand holding the presence-sensitive input device). As yet another example, a computing device may determine a bimodal input posture in which a user is interacting with the presence-sensitive input device with two hands and providing gesture input with, for example, a thumb of each hand.

According to techniques described herein, a computing device may apply at least one offset (e.g., at least one of a horizontal, vertical, or combination of horizontal and vertical offset) to a location associated with a key of a graphical keyboard based at least in part on a determined input posture of a user input. The location associated with the key may be, e.g., a centroid of the key. In certain examples, the computing device may apply a variable offset to locations associated with multiple (e.g., each) keys of the graphical keyboard. For instance, in some examples, the computing device may apply a different offset to locations associated with each of the keys of the graphical keyboard. In response to receiving an indication of user input detected at the presence-sensitive input device, the computing device may select a key of the graphical keyboard based at least in part on the offset location associated with the key and/or an adjusted spatial model.

As an example, a user interacting with a graphical keyboard using a single-finger input posture (e.g., providing gesture input using an index finger of one hand) may tend to provide touch input to select a particular key such that a top portion of the user's finger (e.g., a fingernail) is substantially aligned with a centroid of the key. Accordingly, a region of the presence-sensitive input device that detects the user's finger (e.g., a region of the presence-sensitive input device that detects the fingertip of the user's finger) may correspond to a location that is slightly below the centroid of the key. Similarly, detected locations of touch inputs to select keys of a left region of a graphical keyboard may tend to correspond to locations that are slightly right of the centroid of a particular key while the user is interacting with the graphical keyboard using a right finger of the user.

Rather than determine a selected key of the graphical keyboard based on an initial or same reference location associated with the key regardless of the input posture of the user, a computing device implementing techniques described herein may select a key of the graphical keyboard based at least in part on a comparison of a received touch input to at least one offset location determined with respect to an input posture of the user. Moreover, according to techniques of this disclosure, a computing device may apply different offsets to keys of the graphical keyboard in response to determining different input postures, thereby helping to compensate for different user tendencies with respect to the different postures. As such, techniques of this disclosure may improve usability of a computing device by enabling the computing device to more accurately predict an intended key of a graphical keyboard.

FIG. 1 is a block diagram illustrating an example computing device 2 and graphical keyboard 12 for providing text input, in accordance with one or more aspects of the present disclosure. In some examples, computing device 2 may be associated with a user that may interact with computing device 2 by providing various user inputs to the computing device. Examples of computing device 2 may include, but are not limited to, portable or mobile devices such as mobile phones (including smartphones), laptop computers, desktop computers, tablet computers, smart television platforms, personal digital assistants (PDA's), servers, mainframes, etc. Computing device 2, in some examples, may include user interface (UI) device 4, UI module 6, posture module 8, and offset module 10. Other examples of computing device 2 that implement techniques of this disclosure may include additional components not shown in FIG. 1.

Computing device 2 may include UI device 4. In some examples, UI device 4 is configured to receive tactile, audio, or visual input. Examples of UI device 4 may include a touch-sensitive and/or a presence-sensitive screen, mouse, keyboard, voice responsive system, microphone, camera or other device for receiving input. For example, UI device 4 may include a presence-sensitive input device that may detect the presence of an input unit (e.g., a finger, pen, stylus, and the like) performing one or more gestures. UI device 4 may output for display content such as graphical keyboard 12. In some examples, UI device 4 may include an integrated presence-sensitive input device (e.g., touch-capacitance screen) and display device (e.g., Liquid Crystal Display), which collectively comprises a touch screen or presence-sensitive display. Other such examples are further illustrated in FIG. 3.

As shown in FIG. 1, computing device 2 may include UI module 6. UI module 6 may perform one or more functions to receive input, such as user input, and send indications of such input to other components associated with computing device 2, such as text suggestion module 8. UI module 6 may also receive data from components associated with computing device 2, such as posture module 8 and offset module 10. Using the data, UI module 6 may cause components associated with computing device 2, such as UI device 4, to provide output based on the data. For instance, UI module 6 may receive data from posture module 8 and/or offset module 10, and may cause UI device 4 to display graphical content, such as graphical keyboard 12, based on such data. In some examples, UI module 6 may include functionality associated with one or more applications executable by computing device 2, such as one or more of a word-processing application, text messaging application, spreadsheet, web browser, server application, or other applications. In certain examples, UI module 6 may be implemented as an application executable by one or more processors of computing device 2, such as a downloadable or pre-installed application or "app." In some examples, UI module 6 may be implemented as part of a hardware unit of computing device 2. As another example, UI module 6 may be implemented as part of an operating system of computing device 2.

As shown in FIG. 1, UI module 6 may cause UI device 4 to display graphical content. Graphical content, generally, may be any visually displayable graphical object of a graphical user interface. Examples of graphical content may include text, images, a group of moving images, hyperlink, animation, video, characters of a character set etc. As shown in FIG. 1, graphical content may include graphical keyboard 12.

Graphical keyboard 12 may include a plurality of keys, such as "Q" key 14, "A" key 16, "X" key 18, "C" key 20, and "L" key 24. In some examples, each of the plurality of keys included in graphical keyboard 12 represents a single character. In other examples, one or more of the plurality of keys included in graphical keyboard 12 represents a group of characters selected based on a plurality of modes. Graphical keyboard 12 may be displayed by UI device 4 as an ordered set of selectable keys. Keys may represent a single character from a character set (e.g., letters of the English alphabet), or may represent combinations of characters. One example of a graphical keyboard, as illustrated in FIG. 1, may include a traditional "QWERTY" keyboard layout. Other examples may contain characters for different languages, different character sets, or different character layouts. In some examples, graphical keyboard 12 may include a version of the traditional "QWERTY" keyboard layout for the English language providing character keys as well as various keys (e.g., the "123" key) providing other functionality.

UI module 6 may cause UI device 4 to display graphical keyboard 12 and detect gesture input, such as gesture input detected at one or more locations of UI device 4 associated with one or more keys of graphical keyboard 12. Posture module 8 may determine an input posture of a user input at UI device 4 (e.g., a presence-sensitive and/or touch-sensitive display), and may cause offset module 10 to apply at least one offset to a location of UI device 4 associated with a key of graphical keyboard 12 in accordance with techniques disclosed herein.

As illustrated in FIG. 1, UI module 6 may cause UI device 4 to output, for display, graphical keyboard 12 including a plurality of keys. UI module 6 may receive an indication of a gesture detected at UI device 4 (e.g., a presence-sensitive and/or touch sensitive display). For example, UI device 4 may detect an input unit (e.g., a finger, pen, stylus, and the like) at location 22 of graphical keyboard 12.

According to techniques described herein, posture module 8 may determine an input posture of a gesture detected at UI device 4. In some examples, posture module 8 may determine the input posture as one or more of a single-finger input posture, a single-thumb input posture, and a bimodal input posture. A single-finger input posture may correspond to an input posture in which a user is providing gesture input with a finger of one hand, such as when holding computing device 2 in the other hand. A single-thumb input posture may correspond to an input posture in which a user is providing gesture input with a thumb of one hand, such as with a thumb of a hand holding computing device 2. A bimodal input posture may correspond to an input posture in which a user is providing gesture input with both hands, such as with a thumb of each hand while holding computing device 2 with both hands.

In some examples, posture module 8 may determine the input posture based at least in part on one or more inputs received from at least one sensor of computing device 2 (not illustrated). Non-limiting examples of such sensors may include one or more accelerometers, one or more gyroscopes, and one or more touch sensors (e.g., grip sensors) of computing device 2.

As one example, posture module 8 may determine the input posture based at least in part on physical orientation information received from one or more gyroscopes of computing device 2. For instance, while holding computing device 2 in one hand (e.g., a single-finger input posture and/or a single-thumb input posture), a user may typically hold computing device 2 at a slight angle toward the opposite side of the user. For example, a user holding computing device 2 in a left hand of the user and providing user input gestures with a right hand of the user and/or a left thumb of the user may typically hold computing device 2 such that UI device 4 (e.g., a presence-sensitive input device, such as a presence-sensitive display) is angled toward the right side of the user. Similarly, a user holding computing device 2 in a right hand of the user and providing user input gestures with a left hand of the user and/or a right thumb of the user may typically hold computing device 2 such that UI device 4 is angled toward the left side of the user. In contrast, while holding computing device 2 using both hands (e.g., a bi-modal input posture), a user may typically hold computing device 2 at an angle that is substantially horizontal with respect to the ground. As such, posture module 8 may determine the input posture based at least in part on physical orientation information received from one or more gyroscopes of the computing device 2.

As another example, posture module 8 may determine the input posture based at least in part on a time elapsed between two inputs and a distance between the two inputs detected at UI device 4. For instance, consecutive inputs detected at UI device 4 occurring at longer distances apart but over shorter durations may indicate higher probabilities of a bimodal (e.g., two-thumb) input posture. Consecutive inputs occurring at longer distances apart at UI device 4, but over longer durations, however, may indicate higher probabilities of single-finger input posture. For instance, in the example of FIG. 1, a user may provide a first touch input to select "A" key 16, and may subsequently provide a second touch input to select "L" key 24. Using a bimodal input posture, a user may provide the first touch input to select "A" key 16 with a left thumb of the user, and may provide the second touch input to select "L" key 24 with a right thumb of the user. In contrast, using a single-finger input posture, a user may provide each of the first touch input and the second touch input with a finger of one hand, such as a right finger of the user. A user may typically be capable of providing touch inputs that are separated by larger distances within a shorter time duration using a bimodal input posture than while using a single-finger or single-thumb input posture. This difference may be due to, for example, a shorter distance that each input unit (e.g., thumb) may be required to travel to provide the gesture input while using the bimodal input posture than while using a single-finger and/or single-thumb input posture.

Posture module 8 may receive information from UI module 6 that indicates, for example, a first time at which the first input was detected and a second time at which the second input was detected. Posture module 8 may also receive information from UI module 6 that indicates locations of the first touch input and the second touch input. The alignment points may include coordinates that correspond to locations of UI device 4 at which UI device 4 detects the inputs of the user. Posture module 8 may determine a distance (e.g., a Euclidean distance) between the alignment points of the first input and the alignment points of the second input.

Posture module 8 may determine, based on the time elapsed and the distance between alignment points, whether the user is using a bimodal input posture or one or more of a single-finger or single-thumb input posture. As an example, posture module 8 may determine a ratio of the distance between alignment points and the elapsed time. Posture module 8 may determine that a user is providing gesture input using a bimodal input posture based on a determination that the ratio is greater than (or equal to) a threshold value. Similarly, posture module 8 may determine that the user is providing gesture input using a single-finger and/or single-thumb input posture based on a determination that the ratio is less than (or equal to) a threshold value.

In some examples, posture module 8 may determine an input posture of a user input (e.g., gesture input) based on touch information received from one or more touch sensors of computing device 2. For instance, in certain examples, computing device 2 may include a plurality of touch sensors (e.g., pressure sensors, capacitive sensors, etc.) positioned at various locations of a housing of computing device 2, such as a periphery of a housing of computing device 2. Posture module 8 may receive indications of touch inputs at detected by the plurality of touch sensors, and may determine the user input posture based at least in part on the received inputs.

In some examples, posture module 8 may determine an input posture of a user input based at least in part on an area of the presence-sensitive input device that detects gesture input. For instance, an area of a presence-sensitive input device that detects gesture input provided by a thumb of a user may typically be larger than an area of a presence-sensitive input device that detects gesture input provided by a finger of a user (e.g., a non-thumb digit of a hand of a user).

In certain examples, posture module 8 may determine an input posture of a user input at UI device 4 using a plurality of input values, such as acceleration information, physical orientation information, gesture input information detected at UI device 4, touch location information detected by one or more touch sensors of computing device 2, and the like. In some examples, posture module 8 may determine the input posture using a probabilistic model and based at least in part on one or more of the plurality of input values. Non-limiting examples of such a probabilistic model include machine learning models such as Bayesian networks, artificial neural networks, support vector machines, as well as other probabilistic models. For example, using the probabilistic model, posture module 8 may compare one or more of the received input values to baseline values determined with respect to known input postures.

For instance, during a ground-truth collection phase, input values corresponding to a plurality of features that are usable to determine a user input posture (e.g., physical orientation information, acceleration information, user input information detected at UI device 4, etc.) may be determined with respect to users interacting with a computing device using known input postures. The input values determined with respect to known input postures may be used to determine one or more baseline values, each baseline value corresponding to a respective feature from the plurality of features. The baseline values may serve as a basis for comparison against which posture module 8 may compare received inputs using the probabilistic model. For instance, posture module 8 may determine a feature vector including the plurality of features, each of which is usable to determine an input posture of user input at a presence-sensitive input device (e.g., UI device 4). Posture module 8 may compare an input vector including a plurality of received inputs to the feature vector including the baseline values. Posture module 8 may determine an input posture based at least in part on the comparison.

In certain examples, posture module 8 may determine that a profile associated with a single-finger input posture corresponds to one of a right-finger input posture or a left-finger input posture. Similarly, posture module 8 may determine that a profile associated with a single-thumb input posture corresponds to one of a right-thumb input posture or a left-thumb input posture. A profile associated with an input posture may correspond to data and/or other indications that correlate one or more received inputs to a particular input posture. For instance, posture module 8 may determine a single-finger input posture based at least in part on a plurality of input values received from one or more sensors of computing device 2. In some examples, posture module 8 may determine that a profile of the single-finger input posture corresponds to a right-finger input posture, such as by using a probabilistic model to compare a feature vector corresponding to the plurality of inputs to a baseline feature vector associated with a known right-finger input posture. Posture module 8 may similarly determine that a profile associated with a determined input posture corresponds to one of a left-finger, right-thumb, and left-thumb input posture.

In some examples, posture module 8 may determine a user input posture and/or profile associated with the input posture based on a user selection of the input posture and/or corresponding profile. For instance, a user may explicitly select the input posture and/or profile using, for example, a settings menu or predefined gesture to indicate the posture and/or profile.

Offset module 10 may apply, based at least in part on the determined input posture, at least one offset to a location associated with a key from the plurality of keys of graphical keyboard 12 to determine an offset location associated with the key. The at least one offset may include a horizontal offset, a vertical offset, or a combination of a horizontal and vertical offset. In some examples, offset module 10 may apply the at least one offset to a centroid of the key to determine the offset location. In other examples, offset module 10 may apply the at least one offset to a different location associated with the key, such as an upper left corner of the key, a lower right corner of the key, or other locations of the key. In certain examples, offset module 10 may apply the at least one offset by modifying a spatial model that indicates a probability that a location of UI device 4 is associated with the key, as is further described below.

As illustrated in FIG. 1, offset module 10 may apply horizontal offset 26 and vertical offset 28 to centroid 32 of "Q" key 14 to determine offset location 30 associated with "Q" key 14. Similarly, offset module 10 may apply horizontal offset 34 and vertical offset 36 to centroid 38 to determine offset location 40 associated with "X" key 18, and horizontal offset 42 and vertical offset 44 to centroid 46 to determine offset location 48 associated with "C" key 20. As in the example of FIG. 1, offset module 10 may apply both horizontal and vertical offsets to each of the plurality of keys of graphical keyboard 12. However, aspects of this disclosure are not so limited. For instance, in certain examples, offset module 10 may apply horizontal offsets to locations associated with one or more keys but may not apply vertical offsets to the locations. Similarly, in some examples, offset module 10 may apply vertical offsets to locations associated with one or more keys but may not apply horizontal offsets to the locations. In some examples, offset module 10 may apply at least one offset (i.e., at least one of a horizontal offset, vertical offset, or combination of horizontal and vertical offset) to a first subset of the plurality of keys but not to a second subset of the plurality of keys. In certain examples, offset module 10 may apply variable offsets to locations associated with the keys. For instance, offset module 10 may apply a first offset (e.g., horizontal, vertical, or combination of horizontal and vertical offset) to a location associated with first key, and may apply a second offset to a location associated with a second key. In some examples, offset module 10 may apply differing offsets to locations associated with each of the keys of graphical keyboard 12.

As illustrated in FIG. 1, each of the horizontal and vertical offsets may include both a direction and a magnitude. A combination of a horizontal and vertical offset may include an offset in which the horizontal and vertical components of the resulting combination are defined by the direction and magnitude of the horizontal and vertical components. For example, offset 33 illustrated with a dashed line from centroid 32 to offset location 30 of "Q" key 14 may be considered a combination of horizontal offset 26 and vertical offset 28.

A direction of horizontal offset 26 may be considered a direction from a left region of graphical keyboard 12 to a right region of graphical keyboard 12 with respect to an orientation of graphical keyboard 12. In certain examples, a horizontal offset may include a direction from a right region of graphical keyboard 12 to a left region of graphical keyboard 12, such as horizontal offset 25 associated with "L" key 24. Such left and right regions may be any regions of graphical keyboard 12 such that the left region is positioned left of the right region with respect to an orientation of graphical keyboard 12. The orientation of graphical keyboard 12 may be determined with respect to a direction in which a user viewing text associated with keys of graphical keyboard 12 would naturally read the text with respect to the language of the text. As further illustrated in FIG. 1, a direction of vertical offset 28 may be considered a direction from a top region of graphical keyboard 12 to a bottom region of graphical keyboard 12 with respect to the orientation of graphical keyboard 12. In certain examples, a vertical offset may include a direction from a bottom region of graphical keyboard 12 to a top region of graphical keyboard 12.

In the example of FIG. 1, posture module 8 determines a single-finger input posture associated with a right-finger profile. That is, in the example of FIG. 1, posture module 8 determines that a user is interacting with UI device 4 to select keys of graphical keyboard 12 with a single finger of a right hand of the user. In this example, offset module 10 applies a combination of horizontal and vertical offsets to each of the plurality of keys of graphical keyboard 12 to determine offset locations associated with each of the plurality of keys. As further described below, the magnitude and direction of the combination of horizontal and vertical offsets may help to compensate for user tendencies to provide gesture input to select keys of a graphical keyboard that are below and right of a centroid of keys in a left region of the graphical keyboard and below and left of a centroid of keys in a right region of the graphical keyboard while interacting with the graphical keyboard using a right-finger input posture.

UI module 6 may receive an indication of a gesture detected at UI device 4 (e.g., a presence-sensitive and/or touch sensitive display). For example, UI device 4 may detect an input unit (e.g., a finger, pen, stylus, and the like) at location 22 of graphical keyboard 12. In response to receiving the indication of the gesture detected at location 22, UI module 6 may select, based at least in part on offset location 40, "X" key 18 as a selected key of graphical keyboard 12.

For example, as illustrated in FIG. 1, UI module 6 may determine a first distance 50, such as a Euclidean distance, between location 22 and offset location 40 associated with "X" key 18. In addition, UI module 6 may determine a second distance 52 between location 22 and offset location 40 associated with "C" key 20. In some examples, UI module 6 may select "X" key 18 as based at least in part on a determination that first distance 50 is less than second distance 52. In certain example, UI module 6 may determine a distance between location 22 and locations associated with a each of a group of keys that are proximate (e.g., adjacent to, within a threshold distance of, etc.) location 22. In such examples, UI module 6 may select the key from the group of keys corresponding to the shortest distance (e.g., Euclidean distance) as a selected key.

In this way, techniques described herein may help compensate for user tendencies to provide gesture input corresponding to locations that are offset (e.g., horizontally and/or vertically offset) from centroids of keys of a graphical keyboard while interacting with the graphical keyboard using a particular input posture. As such, a computing device implementing techniques of this disclosure may provide improved prediction of selected keys of a graphical keyboard, thereby improving usability of the computing device.

Figure 2:
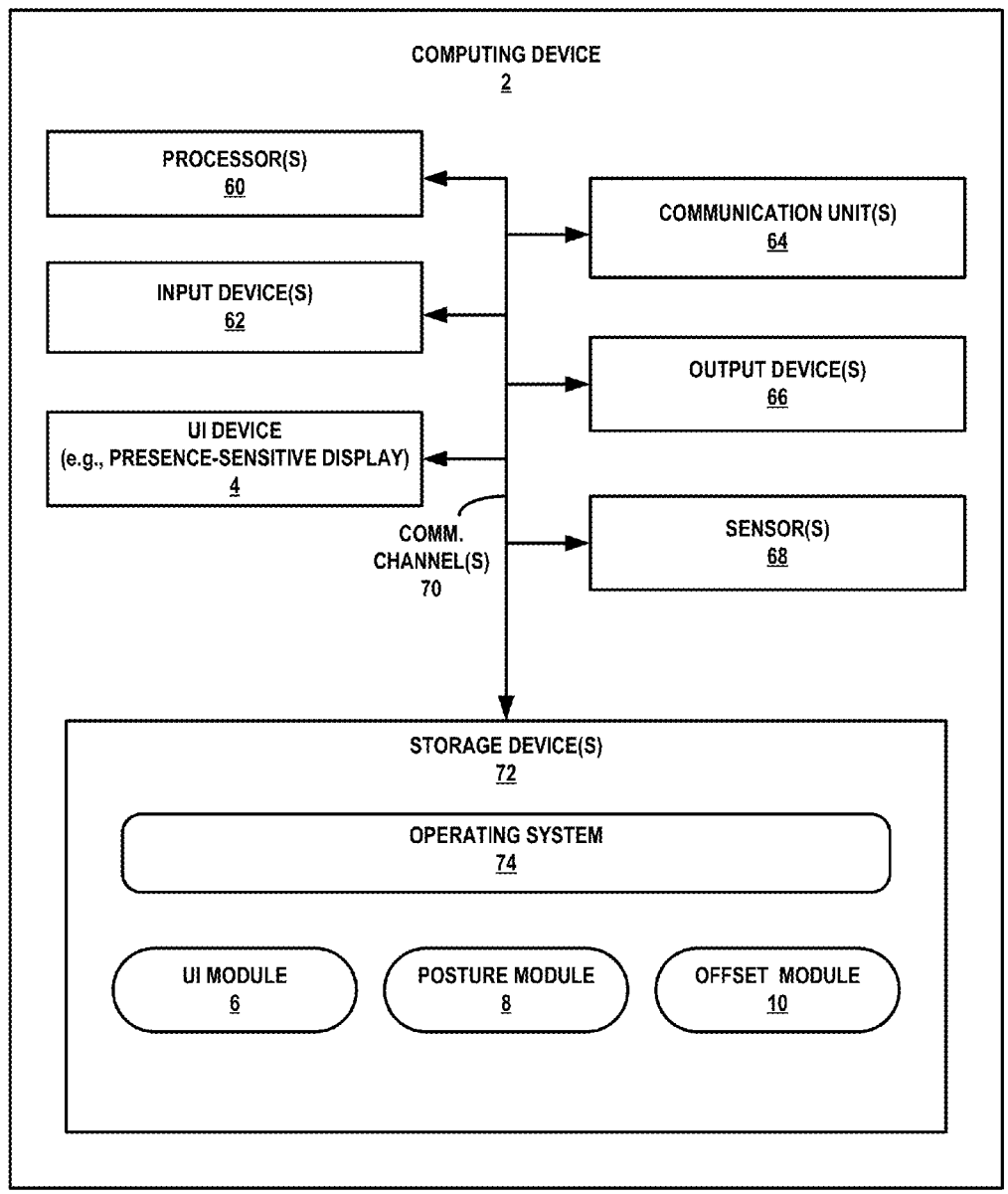
FIG. 2 is a block diagram illustrating further details of one example of a computing device shown in FIG. 1, in accordance with one or more aspects of this disclosure.

FIG. 2 is a block diagram illustrating further details of one example of a computing device shown in FIG. 1, in accordance with one or more aspects of this disclosure. FIG. 2 illustrates only one particular example of computing device 2, and many other examples of computing device 2 may be used in other instances.

As shown in the specific example of FIG. 2, computing device 2 includes one or more processors 60, one or more input devices 62, UI device 4, one or more communication units 44, one or more output devices 66, one or more sensors 68, and one or more storage devices 72. As illustrated, computing device 2 may further include UI module 6, posture module 8, offset module 10, and operating system 74 that are executable by computing device 2 (e.g., by one or more processors 60).

Each of components 4, 60, 62, 64, 66, 68 and 72 may be interconnected (physically, communicatively, and/or operatively) for inter-component communications. In some examples, communication channels 70 may include a system bus, a network connection, an inter-process communication data structure, or any other method for communicating data. As one example in FIG. 2, components 4, 60, 62, 64, 66, 68 and 72 may be coupled by one or more communication channels 70. UI module 6, posture module 8, and offset module 10 may also communicate information with one another as well as with other components of computing device 2.

Processors 60, in one example, are configured to implement functionality and/or process instructions for execution within computing device 2. For example, processors 60 may be capable of processing instructions stored in storage device 72. Examples of processors 60 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 72 may be configured to store information within computing device 2 during operation. Storage device 72, in some examples, is described as a computer-readable storage medium. In some examples, storage device 72 is a temporary memory, meaning that a primary purpose of storage device 72 is not long-term storage. Storage device 72, in some examples, is described as a volatile memory, meaning that storage device 72 does not maintain stored contents when the computer is turned off. Examples of volatile memories include random access memories (RAM), dynamic random access memories (DRAM), static random access memories (SRAM), and other forms of volatile memories known in the art. In some examples, storage device 72 is used to store program instructions for execution by processors 60. Storage device 72, in one example, is used by software or applications running on computing device 2 (e.g., posture module 8 and/or offset module 10) to temporarily store information during program execution.

Storage devices 72, in some examples, also include one or more computer-readable storage media. Storage devices 72 may be configured to store larger amounts of information than volatile memory. Storage devices 72 may further be configured for long-term storage of information. In some examples, storage devices 72 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 64. Computing device 2, in one example, utilizes communication unit 64 to communicate with external devices via one or more networks, such as one or more wireless networks. Communication unit 64 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 64 to wirelessly communicate with an external device such as a server.

Computing device 2, in one example, also includes one or more input devices 62. Input device 62, in some examples, is configured to receive input from a user through tactile, audio, or video feedback. Examples of input device 62 include a presence-sensitive display, a mouse, a keyboard, a voice responsive system, video camera, microphone or any other type of device for detecting a command from a user. In some examples, a presence-sensitive display includes a touch-sensitive screen.

One or more output devices 66 may also be included in computing device 2. Output device 66, in some examples, is configured to provide output to a user using tactile, audio, or video stimuli. Output device 66, in one example, includes a presence-sensitive display, a sound card, a video graphics adapter card, or any other type of device for converting a signal into an appropriate form understandable to humans or machines. Additional examples of output device 66 include a speaker, a cathode ray tube (CRT) monitor, a liquid crystal display (LCD), or any other type of device that can generate intelligible output to a user.

In some examples, UI device 4 may include functionality of input device 62 and/or output device 66. In one example, UI device 4 may be a touch-sensitive screen. In the example of FIG. 2, UI device 4 may be a presence-sensitive input device. In some examples, a presence sensitive display may detect an object, such as an input unit (e.g., user's finger, pen, stylus, etc.) at and/or near the screen of the presence-sensitive input device. As one example range, a presence-sensitive input device may detect an input unit that is within two inches or less of the physical screen of the presence-sensitive input device. The presence-sensitive input device may determine one or more locations (e.g., (x,y) coordinates) of the presence-sensitive input device at which the input unit was detected. In another example range, a presence-sensitive input device may detect an object six inches or less from the physical screen of the presence-sensitive input device and other exemplary ranges are also possible. The presence-sensitive input device may determine the location of the input device selected by an input unit using capacitive, inductive, and/or optical recognition techniques. In some examples, the presence-sensitive input device provides output to a user using tactile, audio, or video stimuli as described with respect to output device 66.

As illustrated in FIG. 2, computing device 2 may include one or more sensors 68. Examples of one or sensors 68 include, but are not limited to, one or more accelerometers, one or more gyroscopes, and one or more touch sensors (e.g., capacitive sensors, pressure sensors, optical sensors, etc.). Computing device 2 may receive a plurality of inputs from sensors 68, such as acceleration information, physical orientation information, touch input information, and the like. In certain examples, computing device 2 may use information received from sensors 68 to determine an input posture of a user input at a presence-sensitive input device (e.g., UI device 4) in accordance with techniques described herein.

Computing device 2 may include operating system 74. Operating system 74, in some examples, controls the operation of components of computing device 2. For example, operating system 74, in one example, facilitates the communication of UI module 6, posture module 8, and/or offset module 10 with processors 60, input device 62, communication unit 64, sensors 68, output device 66, and storage device 72. UI module 6, posture module 8, and offset module 10 may each include program instructions and/or data that are executable by computing device 2. As one example, offset module 10 may include instructions that cause computing device 2 to perform one or more of the operations and actions described in the present disclosure.

UI module 6 may output, for display (e.g., at a presence-sensitive display, such as UI device 4), a graphical keyboard including a plurality of keys. For example, UI module 6 may output graphical keyboard 12 (e.g., a QWERTY keyboard) for display at UI device 4. Posture module 8 may determine an input posture of a user input at a presence-sensitive input device (e.g., UI device 4). For example, posture module 8 may determine an input posture as one or more of a single-finger input posture, a single-thumb input posture, and a bimodal input posture. In certain examples, posture module 8 may determine that an input posture is associated with a profile corresponding to a right-handed or left-handed input posture. As one example, posture module 8 may determine that a single-finger input posture is associated with a profile corresponding to one of a right-finger posture or a left-finger posture. As another example, posture module 8 may determine that a single-thumb input posture is associated with a profile corresponding to one of a right-thumb posture or a left-thumb posture.

Offset module 10 may apply, based at least in part on a determined input posture, at least one offset to a location associated with a key from the plurality of keys of the graphical keyboard to determine an offset location associated with the key. The at least one offset may include a horizontal offset, vertical offset, or combination of horizontal and vertical offset. As one example, posture module 8 may apply horizontal offset 34 and vertical offset 36 (i.e., a combination of horizontal and vertical offsets) to centroid 38 to determine offset location 22 associated with "X" key 18 of graphical keyboard 12. As another example, offset module 10 may apply the at least one offset by adjusting a spatial model that indicates a probability that a location of UI device 4 is associated with the key, as is further described below.

In some examples, offset module 10 may apply a first offset to a first key included in a first group of the plurality of keys, and may apply a second, different offset to a second key included in a second group of the plurality of keys. For instance, offset module 10 may apply a first vertical offset to centroid 32 associated with "Q" key 14 (e.g., vertical offset 28) that is included in a first group of keys, such as a first row of keys of graphical keyboard 12. Offset module 10 may apply a second, different vertical offset to centroid 38 associated with "X" key 18 (e.g., vertical offset 36) that is included in a second group of keys, such as a second row of keys of graphical keyboard 12. As another example, offset module 10 may apply a first horizontal offset to centroid 32 associated with "Q" key 14 (e.g., horizontal offset 26) that is included in a first group of keys, such as a first group of keys included in a left region of graphical keyboard 12 with respect to an orientation of graphical keyboard 12. Offset module 10 may apply a second, different horizontal offset to a centroid of "L" key 25 (e.g., horizontal offset 25) that is included in a second group of keys, such as a second group of keys included in a right region of graphical keyboard 12 with respect to an orientation of graphical keyboard 12.

UI module 6 may receive an indication of a gesture detected at the presence-sensitive input device. For instance, UI module 6 may receive an indication of an input unit (e.g., a finger, pen, stylus, and the like) detected at location 22 of graphical keyboard 12. UI module 6 may select a key of graphical keyboard 12 based at least in part on the at least one offset location. As one example, UI module 6 may determine a first distance 50 between location 22 and offset location 40 associated with "X" key 18. UI module 6 may determine a second distance 52 between location 22 and offset location 48 associated with "C" key 20. In some examples, UI module 6 may determine a plurality of distances between the location associated with the gesture input (e.g., location 22) and a plurality of keys of graphical keyboard 12, such as a plurality of keys that are proximate (e.g., adjacent, within a threshold distance, etc.) of the location associated with the gesture input. UI module 6 may select a key of graphical keyboard 12 based at least in part on a comparison of the plurality of distances. For instance, UI module 6 may select a key of graphical keyboard 12 associated with the shortest distance of the plurality of distances. As one example, UI module 6 may select "X" key 18 as a selected key based at least in part on a determination that distance 50 is less than distance 52.

In certain examples, offset module 10 may adjust one or more offset locations associated with keys of the graphical keyboard based on received user input to modify a selection of at least one key. For instance, offset module 10 may select a key of graphical keyboard 12 based at least in part on an offset location associated with the key. Thereafter, UI module 6 may receive an indication of a user input detected at graphical keyboard 12 to modify the selection, such as user input to delete a selected character associated with the key (e.g., in a text input application, such as a word-processing application, email application, etc.) and select a different character associated with a different key.

As an example, in response to receiving an indication of gesture input detected at location 22 of UI device 4, UI module 6 may select "X" key 18 rather than "C" key 20 based on a determination that a magnitude of distance 50 between location 22 and offset location 40 is less than a magnitude of distance 52 between location 22 and offset location 48. In response, UI module 6 may select an "X" character associated with "X" key 18 for insertion within a text display region associated with, for example, a word-processing application. UI module 6 may receive an indication of subsequent gesture input to delete the "X" character and an indication of gesture input to select "C" key 20, such as an indication of gesture input detected at a location of UI device 4 that is closer to offset location 48 associated with "C" key 20 than offset location 40 associated with "X" key 18.

Offset module 10 may adjust one or more offset locations associated with keys of the graphical keyboard based at least in part on the received gesture input to modify the selected key. For instance, offset module 10 may adjust offset locations 40 and 48 such that a distance between offset location 48 and location 22 is shorter than a distance between offset location 40 and location 22. In certain examples, offset module 10 may select one or more keys of graphical keyboard 12 based at least in part on the adjusted offset locations.

In some examples, offset module 10 may adjust the one or more offset locations by adjusting a spatial model that indicates a probability that a location of the presence-sensitive input device is associated with a key of the graphical keyboard. In some examples, offset module 10 may adjust the one or more offset locations in response to determining that UI module 6 has received gesture input to adjust the selected key a threshold number of times (e.g., two, three, ten, or other threshold numbers). In certain examples, offset module 10 may adjust the one or more offset locations with respect to a particular input posture, but not with respect to other input postures. For instance, offset module 10 may adjust the one or more offset locations with respect to a single-finger input posture, but not with respect to a single-thumb input posture or bimodal input posture. As another example, offset module 10 may adjust the one or more offset locations with respect to a particular input posture and a particular profile associated with the particular input posture (e.g., a right-finger input posture, a left-thumb input posture, etc.), but not with respect to other input postures or other profiles associated with the particular input posture.

Accordingly, computing device 2 may apply one or more offsets to locations associated with keys of a graphical keyboard to help compensate for user tendencies to provide gesture input to select keys that is offset from a centroid of the keys. Moreover, according to techniques described herein, a computing device may adjust such offset locations based on received user input to modify (e.g., correct) key selections, thereby improving key selection for a particular user. In this way, computing device 2 may personalize the precision of key selection to a particular user of the computing device based on the individual user's touch patterns according to selected text by taking entered or corrected text as true labels when, for example, a message is complete (and sent), and updating the one or more offset locations and/or spatial models of each key accordingly.

Figure 3:
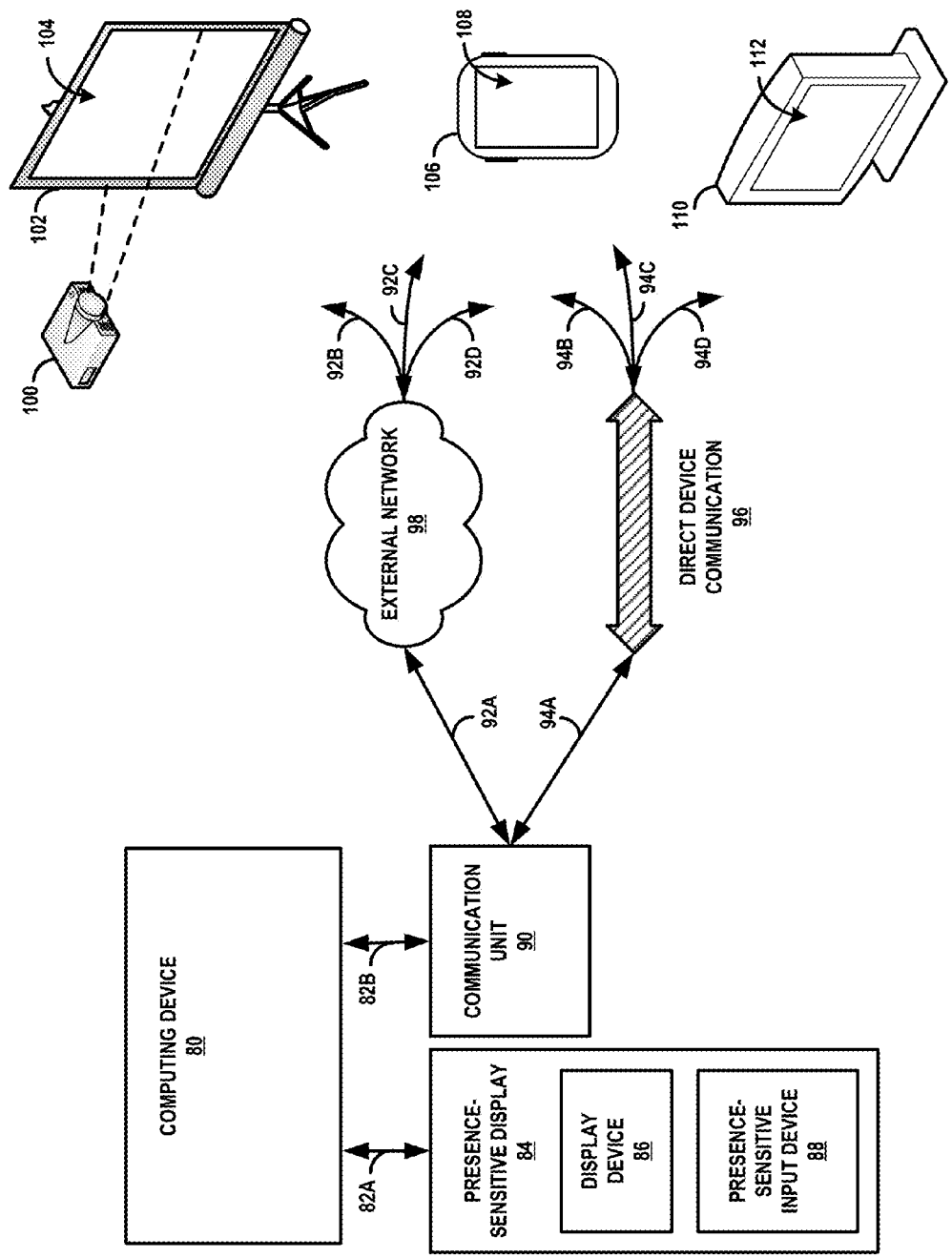
FIG. 3 is a block diagram illustrating an example computing device that outputs graphical content for display at a remote device, in accordance with one or more aspects of this disclosure.

FIG. 3 is a block diagram illustrating an example computing device that outputs graphical content for display at a remote device, in accordance with one or more aspects of this disclosure. Graphical content, generally, may include any visual information that may be output for display, such as text, images, a group of moving images, etc. The example shown in FIG. 3 includes a computing device 80, presence-sensitive display 84, communication unit 90, projector 100, projector screen 102, tablet device 106, and visual display device 110. Although shown for purposes of example in FIGS. 1 and 2 as a stand-alone computing device, a computing device may, generally, be any component or system that includes a processor or other suitable computing environment for executing software instructions and, for example, need not include a presence-sensitive display.

As shown in the example of FIG. 3, computing device 80 may be a processor that includes functionality as described with respect to processor 60 in FIG. 2. In such examples, computing device 80 may be operatively coupled to presence-sensitive display 84 by a communication channel 82A, which may be a system bus or other suitable connection. Computing device 80 may also be operatively coupled to communication unit 90, further described below, by a communication channel 82B, which may also be a system bus or other suitable connection. Although shown separately as an example in FIG. 3, computing device 80 may be operatively coupled to presence-sensitive display 84 and communication unit 90 by any number of one or more communication channels.

In other examples, such as illustrated previously in FIGS. 1-2, computing device 80 may be a portable or mobile device such as mobile phones (including smart phones), laptop computers, etc. In some examples, computing device 80 may be a desktop computers, tablet computers, smart television platforms, cameras, personal digital assistants (PDAs), servers, mainframes, etc.

Presence-sensitive display 84, as shown in FIG. 3, may include display device 86 and presence-sensitive input device 88. Display device 86 may, for example, receive data from computing device 80 and display the graphical content. In some examples, presence-sensitive input device 88 may determine one or more user inputs (e.g., continuous gestures, multi-touch gestures, single-touch gestures, etc.) at presence-sensitive display 84 using capacitive, inductive, and/or optical recognition techniques and send indications of such user input to computing device 80 using communication channel 82A. In some examples, presence-sensitive input device 88 may be physically positioned on top of display device 86 such that, when a user positions an input unit over a graphical element displayed by display device 86, the location at which presence-sensitive input device 88 corresponds to the location of display device 86 at which the graphical element is displayed.

As shown in FIG. 3, computing device 80 may also include and/or be operatively coupled with communication unit 90. Communication unit 90 may include functionality of communication unit 64 as described in FIG. 2. Examples of communication unit 90 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 80 may also include and/or be operatively coupled with one or more other devices, e.g., input devices, output devices, memory, storage devices, etc. that are not shown in FIG. 3 for purposes of brevity and illustration.

FIG. 3 also illustrates a projector 100 and projector screen 102. Other such examples of projection devices may include electronic whiteboards, holographic display devices, and any other suitable devices for displaying graphical content. Projector 100 and project screen 102 may include one or more communication units that enable the respective devices to communicate with computing device 80. In some examples, the one or more communication units may enable communication between projector 100 and projector screen 102. Projector 100 may receive data from computing device 80 that includes graphical content. Projector 100, in response to receiving the data, may project the graphical content onto projector screen 102. In some examples, projector 100 may determine one or more user inputs (e.g., continuous gestures, multi-touch gestures, single-touch gestures, etc.) at projector screen using optical recognition or other suitable techniques and send indications of such user input using one or more communication units to computing device 80.

Projector screen 102, in some examples, may include a presence-sensitive display 104. Presence-sensitive display 104 may include a subset of functionality or all of the functionality of UI device 4 as described in this disclosure. In some examples, presence-sensitive display 104 may include additional functionality. Projector screen 102 (e.g., an electronic whiteboard), may receive data from computing device 80 and display the graphical content. In some examples, presence-sensitive display 104 may determine one or more user inputs (e.g., continuous gestures, multi-touch gestures, single-touch gestures, etc.) at projector screen 102 using capacitive, inductive, and/or optical recognition techniques and send indications of such user input using one or more communication units to computing device 80.

FIG. 3 also illustrates tablet device 106 and visual display device 110. Tablet device 106 and visual display device 110 may each include computing and connectivity capabilities. Examples of tablet device 106 may include e-reader devices, convertible notebook devices, hybrid slate devices, etc. Examples of visual display device 110 may include televisions, computer monitors, etc. As shown in FIG. 3, tablet device 106 may include a presence-sensitive display 108. Visual display device 110 may include a presence-sensitive display 112. Presence-sensitive displays 108, 112 may include a subset of functionality or all of the functionality of UI device 4 as described in this disclosure. In some examples, presence-sensitive displays 108, 112 may include additional functionality. In any case, presence-sensitive display 112, for example, may receive data from computing device 80 and display the graphical content. In some examples, presence-sensitive display 112 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 80.

As described above, in some examples, computing device 80 may output graphical content for display at presence-sensitive display 84 that is coupled to computing device 80 by a system bus or other suitable communication channel. Computing device 80 may also output graphical content for display at one or more remote devices, such as projector 100, projector screen 102, tablet device 106, and visual display device 110. For instance, computing device 80 may execute one or more instructions to generate and/or modify graphical content in accordance with techniques of the present disclosure. Computing device 80 may output the data that includes the graphical content to a communication unit of computing device 80, such as communication unit 90. Communication unit 90 may send the data to one or more of the remote devices, such as projector 100, projector screen 102, tablet device 106, and/or visual display device 110. In this way, computing device 80 may output the graphical content for display at one or more of the remote devices. In some examples, one or more of the remote devices may output the graphical content at a presence-sensitive display that is included in and/or operatively coupled to the respective remote devices.

In some examples, computing device 80 may not output graphical content at presence-sensitive display 84 that is operatively coupled to computing device 80. In other examples, computing device 80 may output graphical content for display at both a presence-sensitive display 84 that is coupled to computing device 80 by communication channel 82A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 80 and output for display at presence-sensitive display 84 may be different than graphical content display output for display at one or more remote devices.

Computing device 80 may send and receive data using any suitable communication techniques. For example, computing device 80 may be operatively coupled to external network 98 using network link 92A. Each of the remote devices illustrated in FIG. 3 may be operatively coupled to network external network 98 by one of respective network links 92B, 92C, and 92D. External network 98 may include network hubs, network switches, network routers, etc., that are operatively inter-coupled thereby providing for the exchange of information between computing device 80 and the remote devices illustrated in FIG. 3. In some examples, network links 92A-92D may be Ethernet, ATM or other network connections. Such connections may be wireless and/or wired connections.

In some examples, computing device 80 may be operatively coupled to one or more of the remote devices included in FIG. 3 using direct device communication 96. Direct device communication 96 may include communications through which computing device 80 sends and receives data directly with a remote device, using wired or wireless communication. That is, in some examples of direct device communication 96, data sent by computing device 80 may not be forwarded by one or more additional devices before being received at the remote device, and vice-versa. Examples of direct device communication 96 may include Bluetooth, Near-Field Communication, Universal Serial Bus, WiFi, infrared, etc. One or more of the remote devices illustrated in FIG. 3 may be operatively coupled with computing device 80 by communication links 94A-94D. In some examples, communication links 92A-92D may be connections using Bluetooth, Near-Field Communication, Universal Serial Bus, infrared, etc. Such connections may be wireless and/or wired connections.

In accordance with techniques of the disclosure, computing device 80 may be operatively coupled to tablet device 106, which may include presence-sensitive display 108 as illustrated in the example of FIG. 3. Computing device 80 may output a graphical keyboard for display at presence-sensitive display 108. For instance, computing device 80 may send data that includes a representation of the graphical keyboard to communication unit 90. Communication unit 90 may send the data that includes the representation of the graphical keyboard to tablet device 106 using external network 98. Table device 106, in response to receiving the data using external network 98, may cause presence-sensitive display 108 to output the graphical keyboard. Computing device 80 may determine an input posture of a user input at presence-sensitive display 108. For example, tablet device 106 may include one or more sensors, such as one or more sensors that are similar to one or more sensors 68 as described with respect to FIG. 2. Computing device 80 may receive a plurality of inputs from the one or more sensors of tablet device 106, such as by using external network 98. Computing device 80 may determine the input posture, such as a single-finger input posture, single-thumb input posture, or bimodal input posture, such as by using the received inputs from the one or more sensors of table device 106. Computing device 80 may apply, based at least in part on the input posture, at least one offset to a location associated with a key from the plurality of keys to determine an offset location associated with the key. In response to a user performing a gesture at presence-sensitive display 108 to select key of the keyboard, tablet device 106 may send an indication of the gesture to computing device 80 using external network 98. Communication unit 90 may receive the indication of the gesture, and send the indication to computing device 80.

In response to receiving the indication of the gesture, computing device 80 may select, based at least in part on the offset location, the key as a selected key. For example, computing device 80 may determine a plurality of distances between the location of presence-sensitive display 108 at which the gesture input was detected and locations associated with a plurality of keys of the graphical keyboard. In certain examples, computing device 80 may select the key associated with the least distance from the plurality of distances. Computing device 80 may select a character associated with the selected key. Computing device 80 may send data that includes the selected character to communication unit 90, which in turn sends the data to tablet device 106 using external network 98. Upon receiving the data, tablet device 106 may cause presence-sensitive display 108 to display the selected character. In this way, computing device 80 may select a key of the graphical keyboard and output a corresponding selected character for display at presence-sensitive screen 108, in accordance with techniques of the disclosure.

Figure 4:
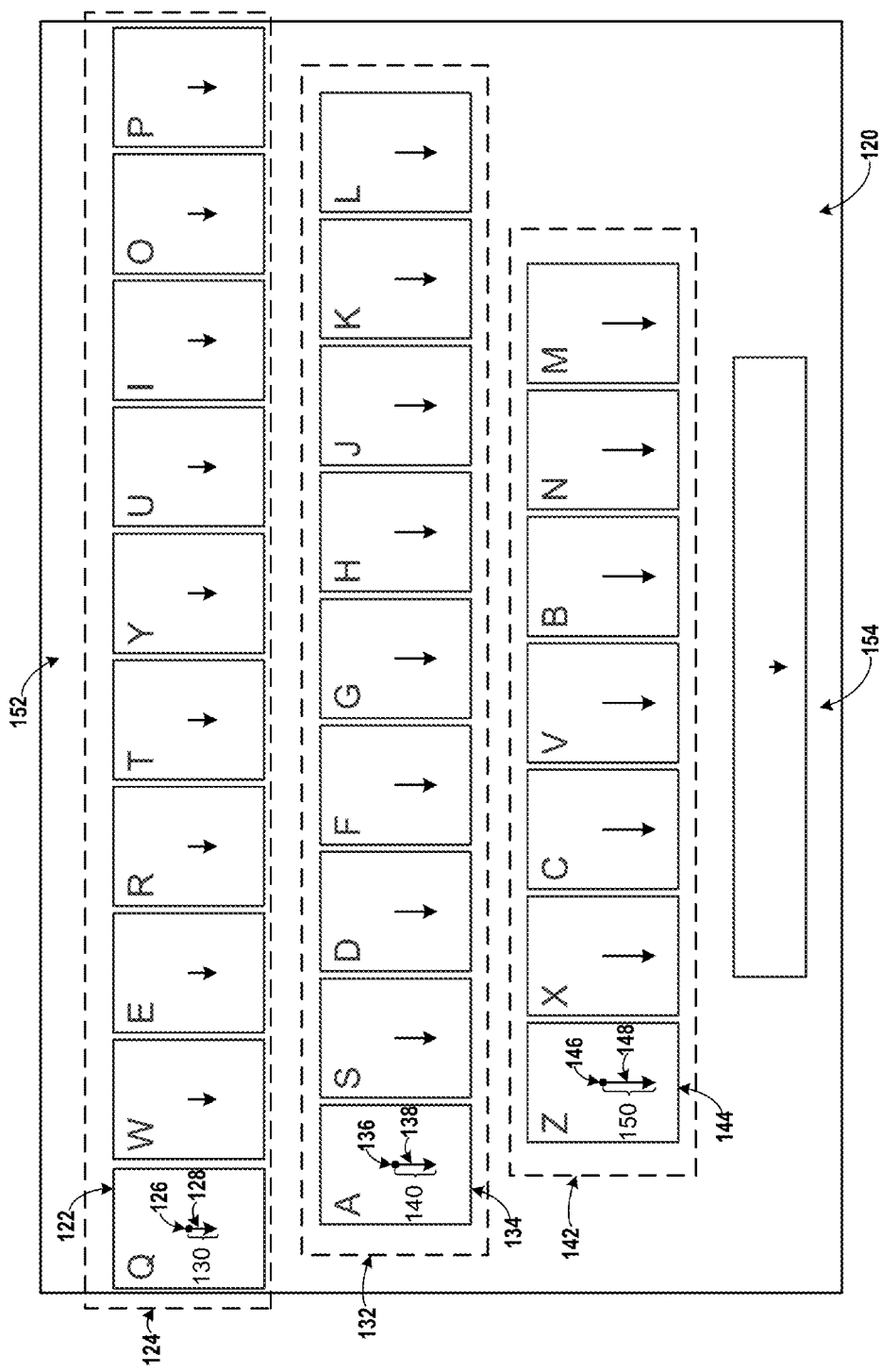
FIG. 4 is a block diagram illustrating an example graphical keyboard including vertical offset locations in accordance with a determined single-finger input posture, in accordance with one or more aspects of this disclosure.

FIG. 4 is a block diagram illustrating an example graphical keyboard 120 including vertical offset locations in accordance with a determined single-finger input posture, in accordance with one or more aspects of this disclosure. For purposes of illustration, the example of FIG. 4 is described with respect to computing device 2 of FIGS. 1 and 2. In the example of FIG. 4, posture module 8 of computing device 2 determines a single-finger input posture of a user input at UI device 4, in accordance with techniques described herein.

Offset module 10 may apply at least one vertical offset to a location associated with a key of graphical keyboard 120 based at least in part on the determined single-finger input posture. For instance, as in the example of FIG. 4, offset module 10 may apply a vertical offset to a location associated with a key of graphical keyboard 120 in a vertical direction from a top region 152 of graphical keyboard 120 to a bottom region 154 of graphical keyboard 120 with respect to an orientation of graphical keyboard 120. In other examples, offset module 10 may apply one or more vertical offsets to locations associated with keys of graphical keyboard 120 in a vertical direction from bottom region 154 to top region 152 of graphical keyboard 120 with respect to an orientation of graphical keyboard 120. Top region 152 and bottom region 154 may be considered top and bottom regions of graphical keyboard 120 with respect to an orientation of graphical keyboard 120 as a user may naturally read text associated with the graphical keyboard (e.g., text displayed at one or more of the keys to identify characters associated with the keys) with respect to a corresponding language of the graphical keyboard (e.g., the English language, French language, Spanish language, and the like).

As illustrated in the example of FIG. 4, offset module 10 may apply first vertical offset 128, having magnitude 130 (e.g., two pixels, four pixels, two millimeters, etc.), to centroid 126 associated with "Q" key 122. As further illustrated, "Q" key 122 may be included in a first row 124 of keys of graphical keyboard 120. Offset module 10 may apply second vertical offset 128, having magnitude 140, to centroid 136 associated with "A" key 134 included in second row 132 of keys of graphical keyboard 120. In addition, offset module 10 may apply third vertical offset 148, having magnitude 150, to centroid 146 associated with "Z" key 144 included in third row 142 of keys of graphical keyboard 120.

In some examples, offset module 10 may apply first vertical offset 128 to each of the keys included in first row 124, second vertical offset 138 to each of the keys included in second row 132, and third vertical offset 148 to each of the keys included in third row 142. In other examples, offset module 10 may apply differing vertical offsets to keys within rows.

In certain examples, offset module 10 may apply vertical offsets to keys of graphical keyboard 120, based at least in part on the determined single-finger input posture, such that a magnitude of the vertical offset increases from first row 124 to third row 142. For instance, as illustrated, magnitude 150 of third vertical offset 148 may be greater than magnitude 140 of second vertical offset 138. In addition, magnitude 140 may be greater than magnitude 130 of first vertical offset 128.

By applying vertical offsets to locations associated with keys of graphical keyboard 120 in a vertical direction from top region 152 to bottom region 154 of graphical keyboard 120, offset module 10 may help to compensate for user tendencies to provide gesture input to select keys with a single-finger input posture such that a location of a presence-sensitive input device that detects the gesture input (e.g., UI device 4) is slightly below a centroid of the keys. In addition, the increase in magnitude of the vertical offset from first row 124 to third row 142 may help to compensate for user tendencies to provide gesture input to select keys from a row of keys such that a vertical offset of the gesture input below the centroid of the keys increases from a top row (e.g., first row 124) to a bottom row (e.g., third row 142) of a graphical keyboard.

Figure 5:
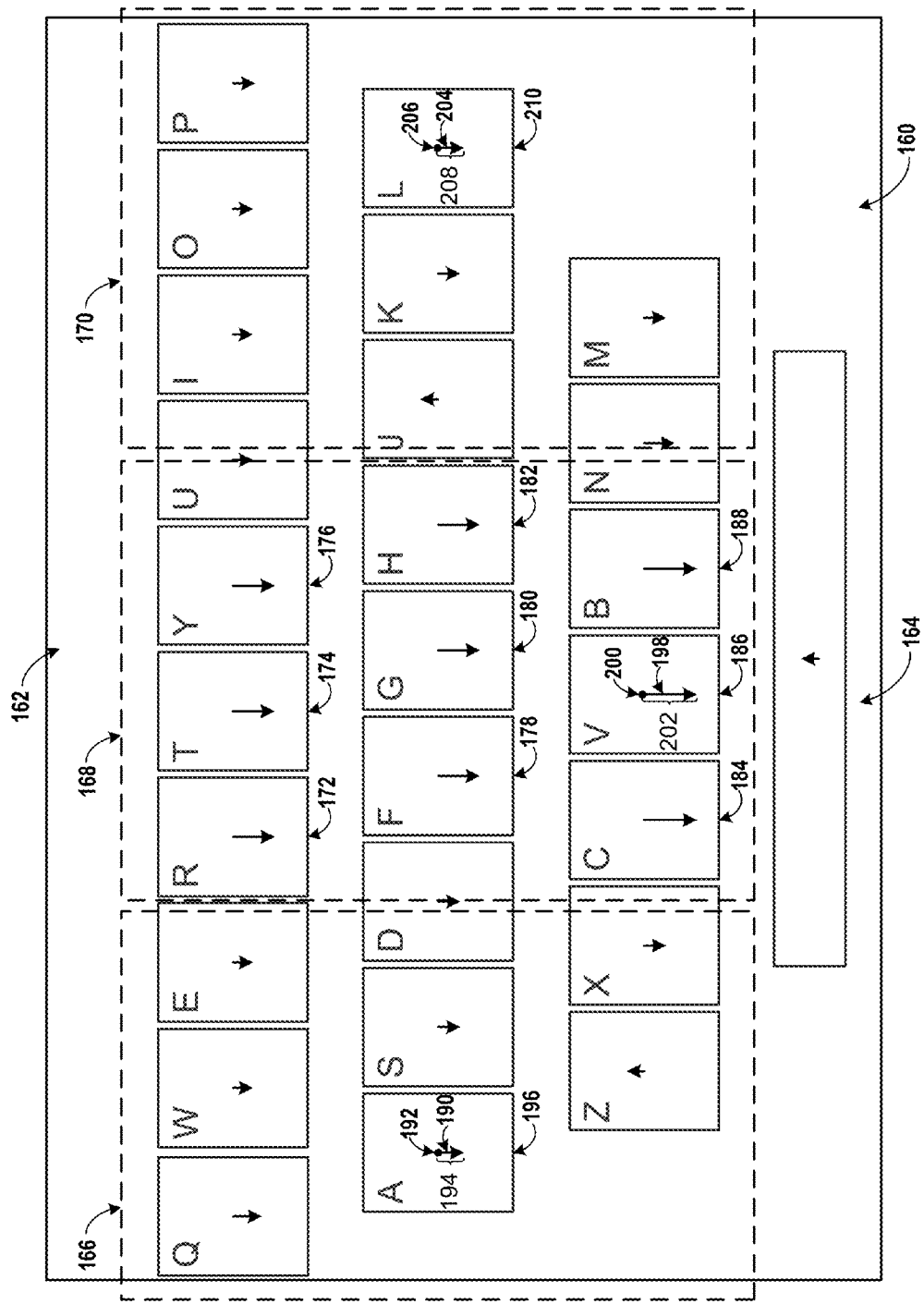
FIG. 5 is a block diagram illustrating an example graphical keyboard including vertical offset locations in accordance with a determined bimodal input posture, in accordance with one or more aspects of this disclosure.

FIG. 5 is a block diagram illustrating an example graphical keyboard 120 including vertical offset locations in accordance with a determined bimodal input posture, in accordance with one or more aspects of this disclosure. For purposes of illustration, the example of FIG. 5 is described with respect to computing device 2 of FIGS. 1 and 2. In the example of FIG. 5, posture module 8 of computing device 2 determines a bimodal input posture of a user input (e.g., using a thumb of each hand of a user) at UI device 4, in accordance with techniques described herein.

Offset module 10 may apply at least one vertical offset to a location associated with a key of graphical keyboard 160 based at least in part on the determined bimodal input posture. For instance, as in the example of FIG. 5, offset module 10 may apply one or more vertical offsets to locations associated with keys of graphical keyboard 160 in a vertical direction from a top region 162 of graphical keyboard 120 to a bottom region 164 of graphical keyboard 160 with respect to an orientation of graphical keyboard 160. As is further illustrated in the example of FIG. 5, offset module 10 may apply one or more vertical offsets to locations associated with keys of graphical keyboard 160 in a vertical direction from bottom region 164 to top region 162. As described above, top region 162 and bottom region 164 may be considered top and bottom regions of graphical keyboard 160 with respect to an orientation of graphical keyboard 160 as a user may naturally read text associated with the graphical keyboard, such as text displayed at one or more of the keys to identify characters associated with the keys.

As illustrated in the example of FIG. 5, offset module 10 may apply first vertical offset 198, having magnitude 202 (e.g., two pixels, four pixels, two millimeters, etc.), to centroid 200 associated with "V" key 186. As further illustrated, "V" key 186 may be included in center region 168 of graphical keyboard 160. Center region 168 may be considered a center region 168 with respect to outer regions of graphical keyboard 160 and an orientation of graphical keyboard 160. For instance, as illustrated in FIG. 5, center region 168 may be a region of graphical keyboard 160 including keys 172-188. In other examples, center region 168 may be a region of graphical keyboard 160 that includes more or fewer keys than keys 172-188, such as one key, two keys, ten keys, fifteen keys, etc. As one example, center region 168 may be a region of graphical keyboard 160 that includes "T" key 174, "F" key 178, "G" key 180, and "V" key 186. As another example, center region 168 may be a region of graphical keyboard 160 that includes "F" key 178 and "G" key 180. In general, center region 168 may be any region of graphical keyboard 160 that is positioned between outer regions of graphical keyboard 160, such as first outer region 166 and second outer region 170.

As illustrated in FIG. 5, offset module 10 may apply first vertical offset 198, having magnitude 202, to centroid 200 associated with "V" key 186 included in center region 168 of graphical keyboard 160. Similarly, offset module 10 may apply second vertical offset 190, having magnitude 194, to centroid 192 associated with "A" key 196 included in first outer region 166. Offset module 10 may apply third vertical offset 204, having magnitude 208, to centroid 206 associated with "L" key 210 included in second outer region 170. As illustrated, magnitude 202 of first vertical offset 198 may be greater than each of magnitude 194 of second vertical offset 190 and magnitude 208 of third vertical offset 204.

In this way, offset module 10 may apply one or more vertical offsets to locations associated with keys of graphical keyboard 160 to help compensate for user tendencies to provide gesture input to select keys of a graphical keyboard using a bimodal input posture (e.g., using a thumb of each hand of the user) such that a location of a presence-sensitive input device that detects the gesture input (e.g., UI device 4) is vertically offset (e.g., in a direction from a top region to a bottom region and/or in a direction from a bottom region to a top region of the graphical keyboard) from a centroid of the keys. In addition, by applying vertical offsets having a greater magnitude to locations associated with keys included in a center region of the graphical keyboard than to locations associated with keys included in outer regions of the graphical keyboard, offset module 10 may help to compensate for user tendencies to provide gesture input that is offset further from a centroid of the keys in the center region using a bimodal input posture.

Figure 6:
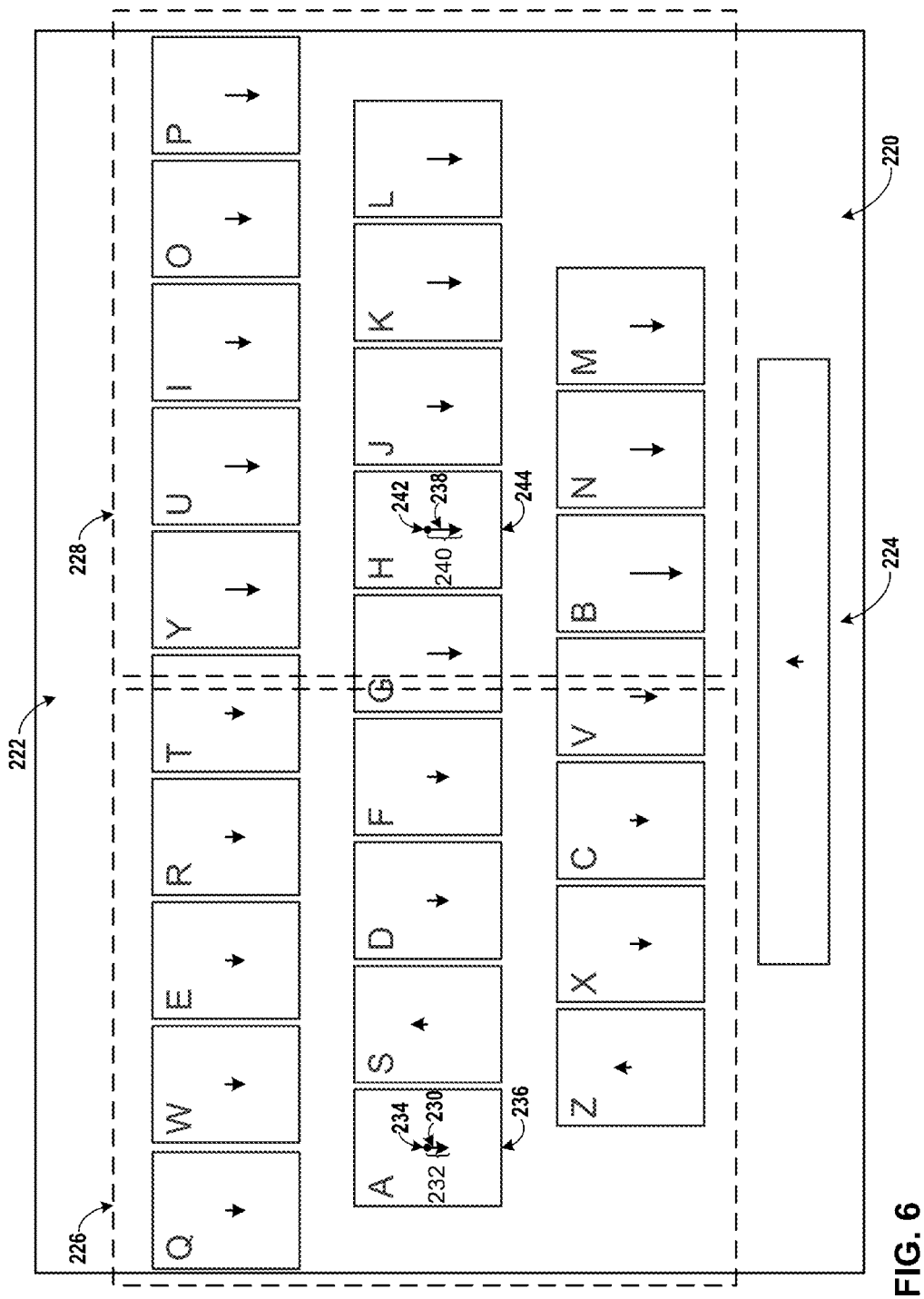
FIG. 6 is a block diagram illustrating an example graphical keyboard including vertical offset locations in accordance with a determined single-thumb input posture, in accordance with one or more aspects of this disclosure.

FIG. 6 is a block diagram illustrating an example graphical keyboard 220 including vertical offset locations in accordance with a determined single-thumb input posture, in accordance with one or more aspects of this disclosure. For purposes of illustration, the example of FIG. 6 is described with respect to computing device 2 of FIGS. 1 and 2. In the example of FIG. 6, posture module 8 of computing device 2 determines a single-thumb input posture of a user input at UI device 4 corresponding to a right-thumb input posture, in accordance with techniques described herein.

Offset module 10 may apply at least one vertical offset to a location associated with a key of graphical keyboard 220 based at least in part on the determined single-thumb input posture associated with the profile corresponding to the right-thumb input posture. For instance, as in the example of FIG. 6, offset module 10 may apply one or more vertical offsets to locations associated with keys of graphical keyboard 220 in a vertical direction from a top region 222 of graphical keyboard 220 to a bottom region 224 of graphical keyboard 220 with respect to an orientation of graphical keyboard 220. As further illustrated, offset module 10 may apply one or more vertical offsets to locations associated with keys of graphical keyboard 220 in a vertical direction from bottom region 224 to top region 222 of graphical keyboard 22 with respect to an orientation of graphical keyboard 220.

As illustrated in FIG. 6, offset module 10 may apply first vertical offset 238, having magnitude 240, to centroid 242 associated with "H" key 244 included in right region 228 of graphical keyboard 220. As illustrated, right region 228 may be a region of graphical keyboard 220 that includes substantially half of the keys of graphical keyboard 220 that are positioned within a right half of graphical keyboard 220. Similarly, left region 226 may be a region of graphical keyboard 220 that includes substantially half of the keys of graphical keyboard 220 that are positioned within a left half of graphical keyboard 220. However, while right region 228 and left region 226 are illustrated as each including substantially half of the keys of graphical keyboard 220, aspects of this disclosure are not so limited. For instance, one or more of right region 228 and left region 226 may include greater or fewer than half of the keys of graphical keyboard 220, such as one key, two keys, twenty keys, or other numbers of keys. In general, right region 228 may be any region of graphical keyboard 220 that is positioned right of a left region of graphical keyboard 220, such as left region 226. In some examples, right region 228 and left region 226 may, when taken together, include all of the keys of graphical keyboard 220. That is, in some examples, each of the keys of graphical keyboard 220 may be included in one of left region 226 and right region 228, such that all of the keys are included in one of left region 226 and right region 228 but none of the keys is included in both left region 226 and right region 228.

As illustrated in FIG. 6, offset module 10 may apply second vertical offset 230, having magnitude 232, to centroid 234 associated with "A" key 236. As illustrated, magnitude 240 of first offset 238 may be greater than magnitude 232 associated with "A" key 236. By applying a vertical offset having a greater magnitude to keys included within right region 228 than left region 226, offset module 10 may help compensate for user tendencies to provide gesture input using a right-thumb input posture to select keys of a graphical keyboard such that a location of a presence-sensitive input device that detects the gesture input (e.g., UI device 4) is slightly below a centroid of the keys, and the magnitude of an offset of the gesture input from the centroid of the keys is greater in a right region than a left region of the graphical keyboard.

While FIG. 6 is illustrated with respect to a single-thumb input posture associated with a profile corresponding to a right-thumb input posture, the techniques may similarly apply to a single-thumb input posture associated with a profile corresponding to a left-thumb input posture. That is, in some examples, posture module 8 may determine a single-thumb input posture associated with a profile corresponding to a left-thumb input posture. In such examples, offset module 10 may apply at least one vertical offset to keys of graphical keyboard 220 in a similar manner to the example of FIG. 6 described with respect to the right-thumb input posture, but reversed. For instance, in response to determining a single-thumb input posture associated with a profile corresponding to a left-thumb input posture, offset module 10 may apply vertical offset 230 to centroid 234 associated with "A" key 236 such that a magnitude of the vertical offset 230 is greater than a magnitude of vertical offset 238 associated with "H" key 244 included in right region 228. In this way, offset module 10 may help compensate for user tendencies to provide gesture input using a left-thumb input posture to select keys of a graphical keyboard such that a location of a presence-sensitive input device that detects the gesture input (e.g., UI device 4) is slightly below a centroid of the keys, and the magnitude of an offset of the gesture input from the centroid of the keys is greater in a left region than a right region of the graphical keyboard.

Figure 7:
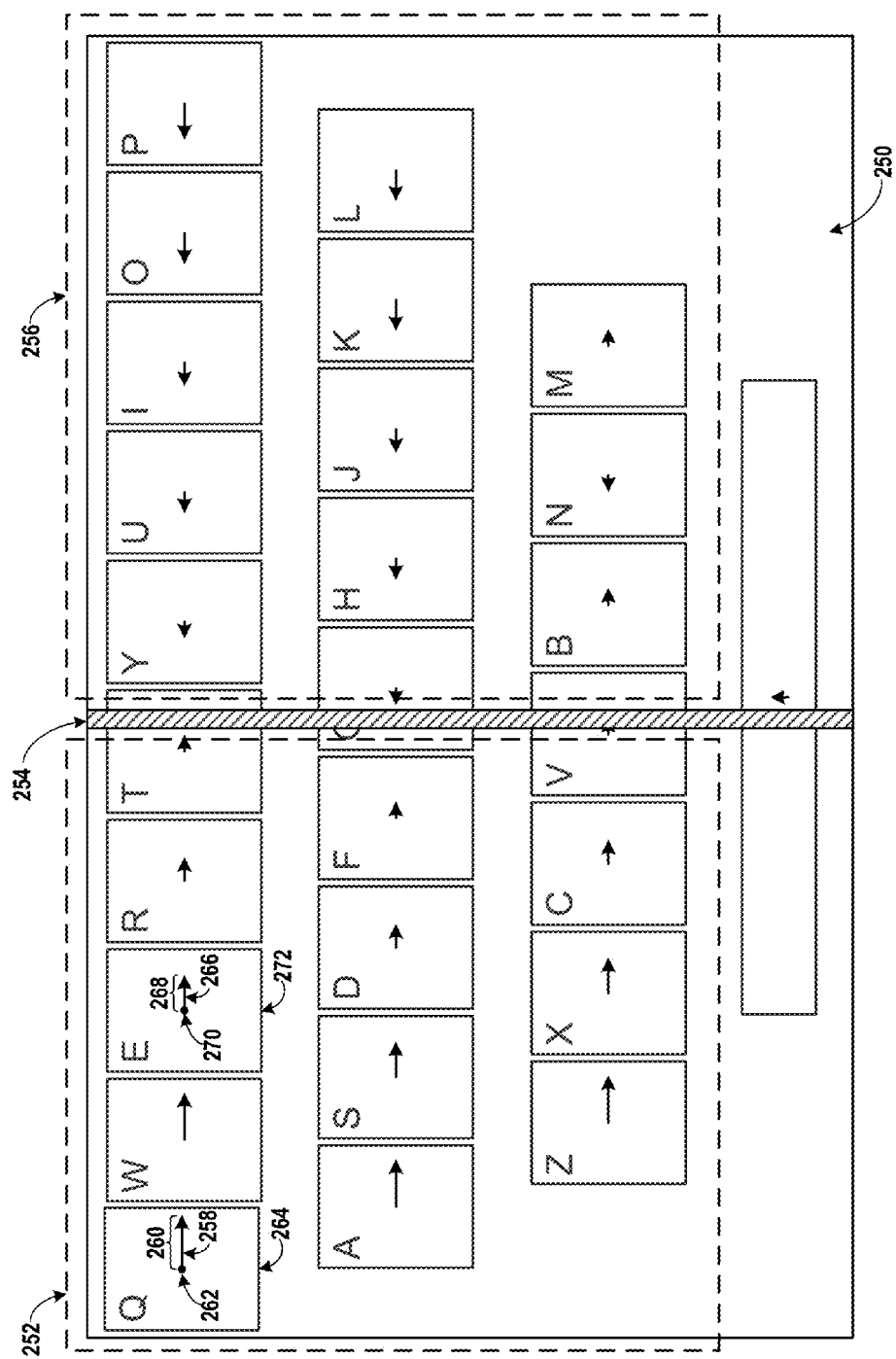
FIG. 7 is a block diagram illustrating an example graphical keyboard including horizontal offset locations in accordance with one or more of a determined single-finger input posture and a single-thumb input posture, in accordance with one or more aspects of this disclosure.

FIG. 7 is a block diagram illustrating an example graphical keyboard 250 including horizontal offset locations in accordance with one or more of a determined single-finger input posture and a single-thumb input posture, in accordance with one or more aspects of this disclosure. For purposes of illustration, the example of FIG. 7 is described with respect to computing device 2 of FIGS. 1 and 2. In the example of FIG. 7, posture module 8 of computing device 2 determines one or more of a single-finger input posture and a single-thumb input posture of a user input at UI device 4 corresponding to one or more of a right-finger and a right-thumb input posture, in accordance with techniques described herein.

Offset module 10 may apply at least one horizontal offset to a location associated with a key of graphical keyboard 250 based at least in part on the determined input posture (i.e., the determined single-finger and/or single-thumb input posture) associated with the profile corresponding one or more of the right-finger and right-thumb input posture. For instance, as in the example of FIG. 7, offset module 10 may apply one or more horizontal offsets to locations associated with keys of graphical keyboard 250 in a horizontal direction from left region 252 of graphical keyboard 250 to right region 256 of graphical keyboard 250 with respect to an orientation of graphical keyboard 250. As further illustrated, offset module 10 may apply one or more horizontal offsets to locations associated with keys of graphical keyboard 250 in a horizontal direction from right region 256 to left region 252 of graphical keyboard 250.

As illustrated in the example of FIG. 7, graphical keyboard 250 may include left region 252, center region 254, and right region 256. Left region 252, center region 254, and right region 256 may be considered left, center, and right regions of graphical keyboard 250 relative to each other and with respect to an orientation of graphical keyboard 250 (i.e., an orientation of graphical keyboard in which a user may naturally read text associated with keys of the graphical keyboard with respect to a language of the text). For instance, in the example of FIG. 7, left region 252 is illustrated as including substantially a left half of the keys of graphical keyboard 250 and right region 256 is illustrated as including substantially a right half of the keys of graphical keyboard 250. Similarly, as illustrated, center region 254 is illustrated as including an area of graphical keyboard 250 that is positioned between left region 252 and right region 256. In some examples, center region 254 may include a vertical line of pixels of graphical keyboard 250 positioned between left region 252 and right region 256. In other examples, such as the example of FIG. 7, center region 254 may include a region of pixels (e.g., including a height and width) position between left region 252 and right region 256. In certain examples, one or more of left region 252 and right region 256 may include greater or fewer than substantially half of the keys of graphical keyboard 250, such as two, three, ten, twenty, or other numbers of keys. In some examples, center region 254 may be a region of graphical keyboard 250 such that center region 254 is positioned between left region 252 and right region 256, but is offset left or right from a vertically-centered axis of graphical keyboard 250. In general, left region 252, center region 254, and right region 256 may be any regions of graphical keyboard 250 such that left region 252 is positioned left of right region 256, and center region 254 is positioned between left region 252 and right region 256.

Offset module 10 may apply, based at least in part on the determined input posture (e.g., one or more of a single-finger input posture and a single-thumb input posture associated with a profile corresponding to one or more of a right-finger and right-thumb input posture), one or more horizontal offsets to locations associated with keys of graphical keyboard 250. As illustrated in FIG. 7, offset module 10 may apply first horizontal offset 258, having magnitude 260, to centroid 262 associated with "Q" key 264 included in left region 252. Offset module 10 may apply second horizontal offset 266, having magnitude 268, to centroid 270 associated with "E" key 272 included in left region 252.

Magnitude 260 may be based at least in part on a first distance between centroid 262 and center region 254, such as a vertically-centered axis of center region 254, a left-edge of center region 254, a right edge of center region 254, or other portions of center region 254. As one example, magnitude 260 may be linearly proportional to the first distance between centroid 262 and center region 254. As another example, magnitude 260 may be non-linearly proportional to the first distance. Similarly, magnitude 268 may be based at least in part on a second distance between centroid 270 and center region 254, such as linearly or non-linearly proportional to the second distance. As illustrated, magnitude 260 may be greater than magnitude 268. As such, offset module 10 may apply one or more offsets to keys of graphical keyboard 250 such that a magnitude of the horizontal offset of keys included in a left region of the graphical keyboard increase from a center region of the graphical to the left region. Similarly, as illustrated in FIG. 7, offset module 10 may apply one or more offsets to keys of graphical keyboard 250 such that a direction of the horizontal offset of keys included in a right region of the graphical keyboard 250 is opposite the direction of the horizontal offset of keys included in the left region, and a magnitude of the horizontal offset of the keys included in the right region increases from the center region of the graphical keyboard to the right region.

While FIG. 7 is illustrated with respect to one or more of a single-finger and single-thumb input posture associated with a profile corresponding to one or more of a right-finger and a right-thumb input posture, the techniques may similarly apply to one or more of a single-finger and single-thumb input posture associated with a profile corresponding to one or more of a left-finger and a left-thumb input posture. That is, in some examples, posture module 8 may determine one or more of a single-finger and single-thumb input posture associated with a profile corresponding to one or more of a left-finger and left-thumb input posture. In such examples, offset module 10 may apply at least one horizontal offset to keys of graphical keyboard 250 in a similar manner to the example of FIG. 7 described with respect to a left-finger and/or left-thumb input posture, but reversed.

By applying a horizontal offset to keys included within left region 252 and right region 256 in a direction from a centroid of the keys to a center region of graphical keyboard 250, offset module 10 may help compensate for user tendencies to provide gesture input using a single-finger and/or single-thumb input posture such that a location of a presence-sensitive input device that detects the gesture input (e.g., UI device 4) is offset toward the center region of the graphical keyboard. In addition, the increased magnitude of the horizontal offsets as the distance of the centroid of the key to the center region of the graphical keyboard increases may help compensate for user tendencies to provide gesture input that is offset further from the centroid of those keys that are further from the center region of the graphical keyboard.

Figure 8:
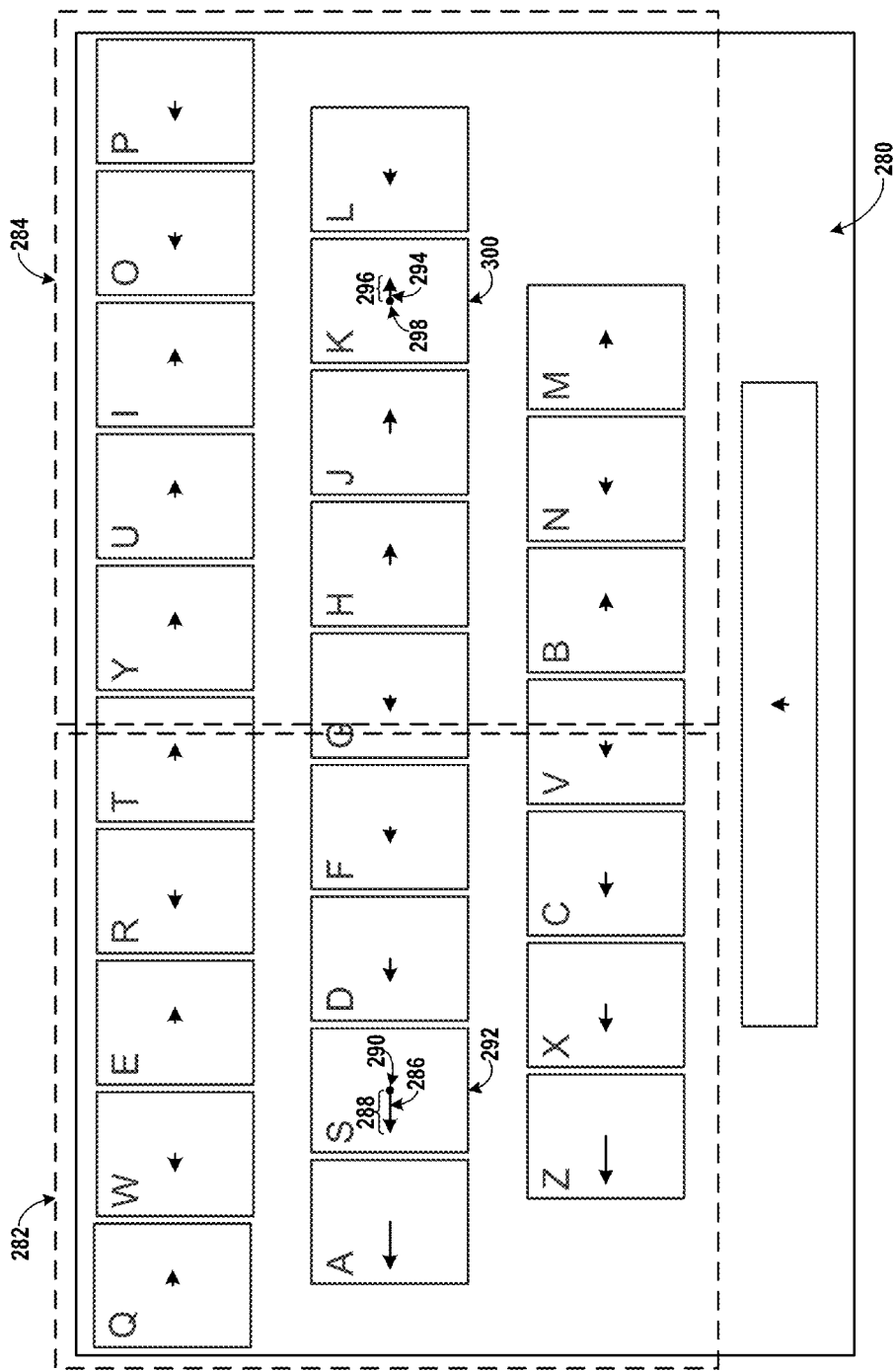
FIG. 8 is a block diagram illustrating an example graphical keyboard including horizontal offset locations in accordance with a determined bimodal input posture, in accordance with one or more aspects of this disclosure.

FIG. 8 is a block diagram illustrating an example graphical keyboard 280 including horizontal offset locations in accordance with a determined bimodal input posture, in accordance with one or more aspects of this disclosure. For purposes of illustration, the example of FIG. 8 is described with respect to computing device 2 of FIGS. 1 and 2. In the example of FIG. 8, posture module 8 of computing device 2 determines a bimodal input posture (e.g., a two-thumb input posture) of a user input at UI device 4.

As illustrated in FIG. 8, offset module 10 may apply one or more horizontal offsets to locations associated with keys of graphical keyboard 280 based at least in part on the determined bimodal input posture. For example, offset module 10 may apply first horizontal offset 286, having magnitude 288, to centroid 290 associated with "S" key 292. Offset module 10 may apply second horizontal offset 294, having magnitude 296, to centroid 298 associated with "K" key 300. As illustrated, "S" key 292 may be included in left region 282 of graphical keyboard 280. "K" key 300 may be included in right region 284 of graphical keyboard 280. As similarly described above, left region 282 and right region 284 may be considered left and right regions of graphical keyboard 280 with respect to an orientation of graphical keyboard 280, such as an orientation in which a user may naturally read text included in graphical keyboard 280 to identify characters associated with keys of graphical keyboard 280. Left region 282 and right region 284 may each be any region of graphical keyboard 280 such that left region 282 is positioned left of right region 284 with respect to the orientation of graphical keyboard 280.

As illustrated, offset module 10 may apply first horizontal offset 286 in a direction from right region 284 to left region 282. Offset module 10 may apply second horizontal offset 294 in a direction from left region 282 to right region 284. As illustrated in the example of FIG. 8, magnitude 288 of first offset 286 may be greater than magnitude 296 of second offset 294. By applying horizontal offsets to one or more keys of graphical keyboard 280 included in left region 282 in a direction from right region 284 to left region 282 and applying horizontal offsets to one or more of the keys included in right region 284 in a direction from left region 282 to right region 284, offset module 10 may help compensate for user tendencies to provide gesture input to select keys of the graphical keyboard that is offset to the left of centroids of keys included in left region 282 and offset to the right of centroids of keys included in right region 284 while interacting with the graphical keyboard using a bimodal input posture. In addition, the greater magnitude of the one or more horizontal offsets associated with keys included in left region 282 than horizontal offsets associated with keys included in right region 284 may help compensate for user tendencies to provide gesture input that is offset by greater amounts when selecting keys included in left region 282 than when selecting keys included in right region 284 while using a bimodal input posture.

Figure 9:
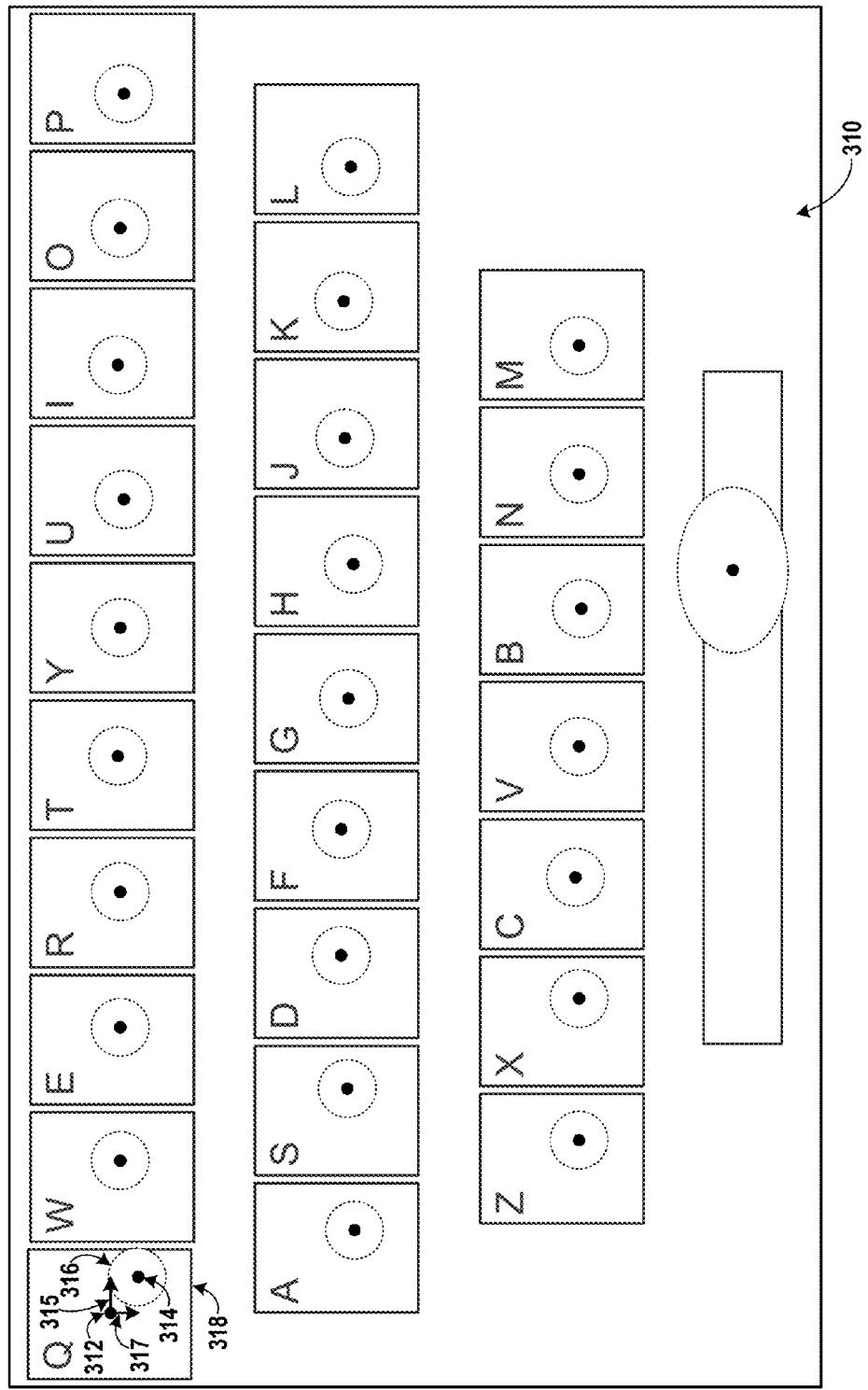
FIG. 9 is a block diagram illustrating an example graphical keyboard, in accordance with one or more aspects of this disclosure.

FIG. 9 is a block diagram illustrating an example graphical keyboard 310, in accordance with one or more aspects of this disclosure. For purposes of illustration, the example of FIG. 8 is described with respect to computing device 2 of FIGS. 1 and 2.

In some examples, offset module 10 may select a key of graphical keyboard 310 based at least in part on a spatial model that indicates a probability that one or more locations of a presence-sensitive input device (e.g., UI device 4) are associated with keys of a graphical keyboard. For example, the spatial model may store key data including, for example, statistical values associated with a key of graphical keyboard 310, location values associated with the key in the keyboard, a mathematical definition of the key, etc. The spatial model may be stored in, for instance, one or more data structures, such as an array, a list, a structured file such as a filed encoded using eXtensible Markup Language (XML), etc.

In certain examples, the spatial model may include values for a bivariate Gaussian distribution of touch points for each key of a graphical keyboard. In other examples, the spatial model may include any other means of defining an area of an input device to be associated with a key of a graphical keyboard, such as values defining the location and size of the key, values defining the location and space between the keys, etc. In the context of bivariate Gaussian models, the mean values, standard deviation values, and/or co-variance values for each key may be preset or learned from data.

In some examples, offset module 10 may apply one or more offsets to locations associated with keys of graphical keyboard 310 by adjusting at least a portion of the spatial model. For instance, offset module 10 may adjust at least a portion of the spatial model such that a ninety-five percent confidence threshold indicating that a location of the presence-sensitive input device is associated with a key of graphical keyboard 310 is offset from a centroid of the key by one or more of a horizontal offset, vertical offset, or combination of horizontal and vertical offset.

As one example, FIG. 9 illustrates a plurality of confidence regions, such as confidence region 316, indicated by dashed lines about centroids of the confidence region (e.g., centroid 314 of confidence region 316). In this example, each of the confidence regions is associated with a region of graphical keyboard 310 that is within two standard deviations (e.g., approximately ninety-five percent) of a mean of a bivariate Gaussian distribution of probabilities that locations within the region are associated with the corresponding key of graphical keyboard 310. Similarly, centroids of each confidence region, such as centroid 314 of confidence region 316, indicate a mean of the bivariate Gaussian distribution.

In certain examples, offset module 10 may apply at least one of a horizontal offset, vertical offset, and a combination of a horizontal and vertical offset to a means of a bivariate Gaussian model to determine the offset locations associated with keys of graphical keyboard 310. For instance, as illustrated in FIG. 9, offset module 10 may adjust a bivariate Gaussian model such that centroid 314 (e.g., corresponding to the mean of the distribution associated with "Q" key 18) of confidence region 316 (e.g., a region including locations within two standard deviations of the mean) is offset from centroid 312 associated with "Q" key 18 by a combination of horizontal offset 315 and vertical offset 317.

In some examples, offset module 10 may adjust at least a portion of the spatial model, such as by adjusting a shape of the probabilistic distribution of locations associated with keys of graphical keyboard 310. For example, offset module 10 may adjust a shape of the confidence regions, such as confidence region 316, to indicate a modified region of locations of the presence-sensitive input device associated with each of the keys of graphical keyboard 310.

In response to receiving an indication of a gesture detected at a location of UI device 4, UI module 6 may select a key of graphical keyboard 310 based at least in part on a probability that the location is associated with a key of graphical keyboard 310 as indicated by the adjusted spatial model. For example, UI module 6 may compare a location of UI device 4 to the spatial model to determine the key of graphical keyboard 310 that is associated with a highest probability as indicated by the spatial model. UI module 6, in certain examples, may select the key that is associated with the highest probability as a selected key of graphical keyboard 310. In this way, computing device 2 may apply at least one offset to a location associated with a key of graphical keyboard 310 by adjusting at least a portion of a spatial model that indicates a probability that a location of UI device 4 is associated with the key of graphical keyboard 310.

Figure 10:
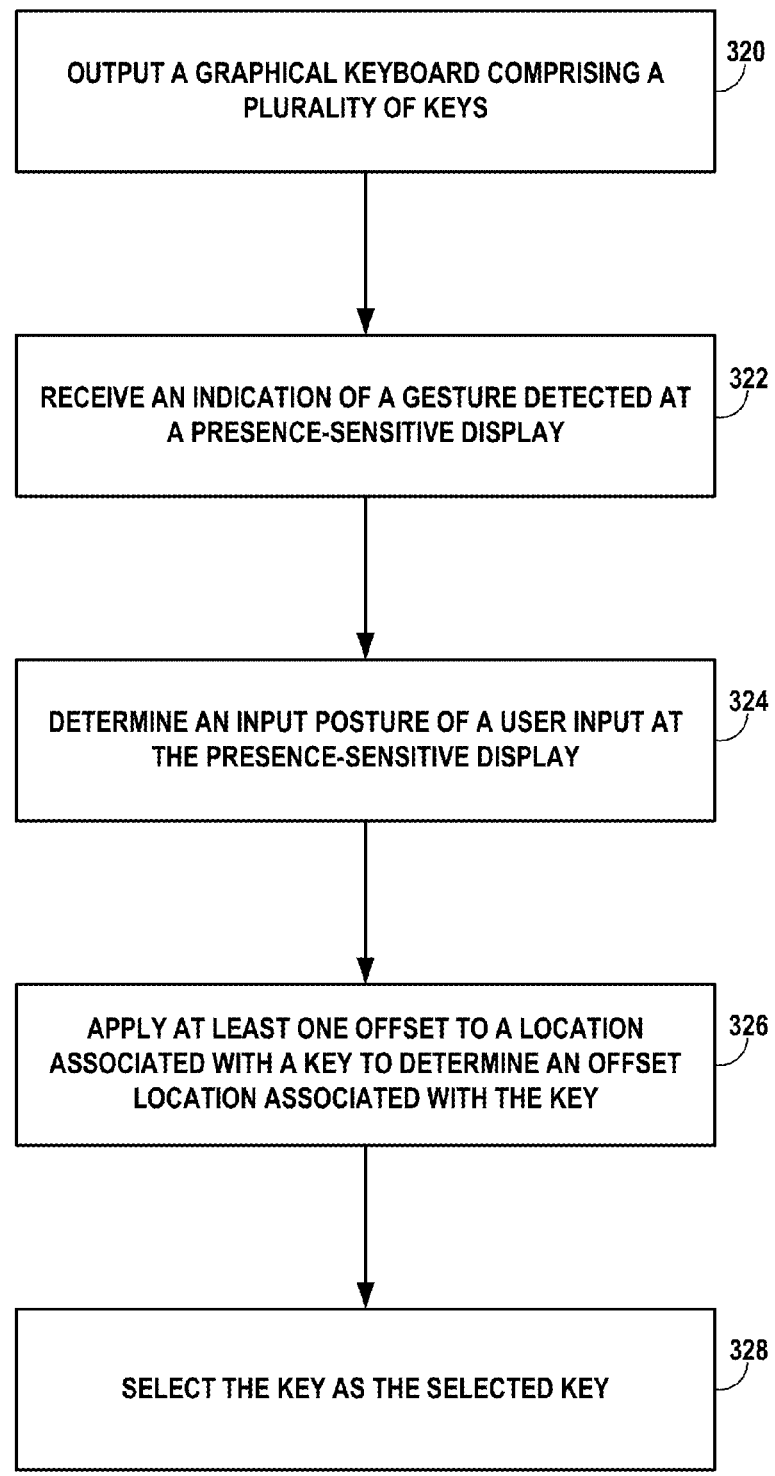
FIG. 10 is a flow diagram illustrating example operations of a computing device to apply at least one offset to a location associated with a key of a graphical keyboard, in accordance with one or more aspects of this disclosure.

FIG. 10 is a flow diagram illustrating example operations of a computing device to apply at least one offset to a location associated with a key of a graphical keyboard, in accordance with one or more aspects of this disclosure. For purposes of illustration, the example operations are described below within the context of computing device 2, as shown in FIGS. 1 and 2.

Computing device 2 may output, for display, a graphical keyboard comprising a plurality of keys (320). For example, UI module 6, executing on one or more processors 60, may output graphical keyboard 12 for display at UI device 4 (e.g., a presence-sensitive and/or touch-sensitive display). Computing device 2 may receive an indication of a gesture detected at a presence-sensitive input device (322). For instance, UI module 6 may receive an indication of a touch gesture detected at location 22 of UI device 4.

Computing device 2 may determine an input posture of the gesture at the presence-sensitive input device (324). As an example, posture module 8, executing on one or more processors 60, may determine one or more of a single-finger, single-thumb, and bimodal input posture. In certain examples, posture module 8 may determine that a profile associated with the input posture corresponds to one of a right-handed and left-handed input posture. As one example, posture module 8 may determine that a profile associated with a single-finger input posture corresponds to one of a right-finger input posture and a left-finger input posture. As another example, posture module 8 may determine that a profile associated with a single-thumb input posture corresponds to one of a right-thumb input posture and a left-thumb input posture.

Computing device 2 may apply, based at least in part on the input posture, at least one offset to a location associated with a key from the plurality of keys to determine an offset location associated with the key (326). For example, offset module 10 may apply horizontal offset 34 and vertical offset 36 (i.e., a combination of a horizontal offset and a vertical offset) to centroid 38 of "X" key 18 to determine offset location 40 associated with "X" key 18 of graphical keyboard 12. In response to receiving the indication of the gesture, UI module 6 may select, based at least in part on the offset location, the key as a selected key (328). For example, UI module 6 may determine first distance 50 between location 22 corresponding to the received indication of the gesture input and offset location 40 associated with "X" key 18. In addition, UI module 6 may determine second distance 52 between location 22 and offset location 48 associated with "C" key 20. UI module 6 may select "X" key 18 as a selected key based at least in part on a determination that first distance 50 is less than second distance 52.

In one example, the input posture comprises at least one of a single-finger input posture, a single-thumb input posture, and a bimodal input posture. In one example, applying the at least one offset to the location associated with the key further comprises applying, by computing device 2, a first offset to the location associated with the key, wherein the key is included in a first group of keys from the plurality of keys, the operations further comprise applying, by computing device 2, a second offset to a second location associated with a second key from a second group of keys from the plurality of keys, and the first offset is different from the second offset. In one example, each of the first offset and the second offset comprise one of a horizontal offset, a vertical offset, and a combination of a horizontal offset and a vertical offset.

In one example, determining the input posture of the gesture at the presence-sensitive input device comprises determining a single-finger input posture, applying the at least one offset to the location associated with the key comprises applying a first vertical offset to the location associated with the key included in a first row of keys from the plurality of keys, the operations further comprise applying, by computing device 2, a second vertical offset to a second location associated with a second key included in a second row of keys from the plurality of keys, and a magnitude of the second vertical offset is greater than a magnitude of the first vertical offset. In one example, the operations further comprise applying, by computing device 2, a third vertical offset to a third location associated with a third key included in a third row of keys from the plurality of keys, wherein a magnitude of the third vertical offset is greater than the magnitude of the second vertical offset. In one example, the first vertical offset, the second vertical offset, and the third vertical offset are each applied in a vertical direction from a top region of the graphical keyboard to a bottom region of the graphical keyboard with respect to an orientation of the graphical keyboard.

In one example, determining the input posture of the gesture at the presence-sensitive input device comprises determining a bimodal input posture, applying the at least one offset to the location associated with the key comprises applying a first vertical offset to the location associated with the key, wherein the key is included within a center region of the graphical keyboard, and the operations further comprise applying a second vertical offset to a second location associated with a second key included within a first outer region of the graphical keyboard, and applying a third vertical offset to a third location associated with a third key included within a second outer region of the graphical keyboard, wherein a magnitude of the first vertical offset is greater than a magnitude of each the second vertical offset and the third vertical offset, and wherein the center region is positioned between the first outer region and the second outer region.

In one example, determining the input posture of the gesture at the presence-sensitive input device comprises determining a single-thumb input posture, and the operations further comprise determining, by computing device 2, that a profile associated with the single-thumb input posture corresponds to a right-thumb input posture. In such an example, applying the at least one offset to the location associated with the key comprises applying a first vertical offset to the location associated with the key, wherein the key is included within a right region of the graphical keyboard positioned right of a left region of the graphical keyboard with respect to an orientation of the graphical keyboard, and the operations further comprise applying, by computing device 2, a second vertical offset to a second location associated with a second key included within a left region of the graphical keyboard, wherein a magnitude of the first vertical offset is greater than a magnitude of the second vertical offset.

In one example, determining the input posture of the gesture at the presence-sensitive input device comprises determining a single-thumb input posture, and the operations further comprise determining, by computing device 2, that a profile associated with the single-thumb input posture corresponds to a left-thumb input posture. In such an example, applying the at least one offset to the location associated with the key comprises applying a first vertical offset to the location associated with the key, wherein the key is included within a left region of the graphical keyboard positioned left of a right region of the graphical keyboard with respect to an orientation of the graphical keyboard, and the operations further comprise applying, by computing device 2, a second vertical offset to a second location associated with a second key included within a right region of the graphical keyboard, wherein a magnitude of the first vertical offset is greater than a magnitude of the second vertical offset.

In one example, determining the input posture of the gesture at the presence-sensitive input device comprises determining at least one of a single-finger input posture and a single-thumb input posture, and applying the at least one offset to the location associated with the key comprises applying, based at least in part on a first distance between the location associated with the key and a substantially center region of the graphical keyboard positioned between a left region of the graphical keyboard and a right region of the graphical keyboard with respect to an orientation of the graphical keyboard, a first horizontal offset to the location associated with the key. In such an example, the operations further comprise applying, by computing device 2 and based at least in part on a second distance between a second location associated with a second key and the substantially center region of the graphical keyboard, a second horizontal offset to the second location associated with the second key, wherein a magnitude of the first horizontal offset is greater than a magnitude of the second horizontal offset.

In one example, a magnitude of the first distance between the location associated with the key and the substantially center region of the graphical keyboard is greater than a magnitude of the second distance between the location associated with the second key and the substantially center region of the graphical keyboard. In one example, the operations further comprise determining, by computing device 2, that a profile associated with the posture of the gesture at the presence-sensitive input device corresponds to at least one of a right-finger input posture and a right-thumb input posture, wherein each of the first key and the second key are included within the left region, and wherein each of the first horizontal offset and the second horizontal offset are applied in a horizontal direction from the left region of the graphical keyboard to the right region of the graphical keyboard.

In one example, the operations further comprise determining, by computing device 2, that a profile associated with the posture of the gesture at the presence-sensitive input device corresponds to at least one of a left-finger input posture and a left-thumb input posture. In such an example, each of the first key and the second key are included within the right region of the graphical keyboard, and each of the first horizontal offset and the second horizontal offset are applied in a horizontal direction from the right region of the graphical keyboard to the left region of the graphical keyboard.

In one example, determining the input posture of the gesture at the presence-sensitive input device comprises determining a bimodal input posture, the key is included within a left region of the graphical keyboard that is positioned left of a right region of the graphical keyboard with respect to an orientation of the graphical keyboard, applying the at least one offset to the location associated with the key comprises applying a first horizontal offset to the location associated with the key in a horizontal direction from the right region of the graphical keyboard to the left region of the graphical keyboard, and the operations further comprise applying, by computing device 2, a second horizontal offset to a second location associated with a second key included within the right region of the graphical keyboard in a direction from left region of the graphical keyboard to the right region of the graphical keyboard. In such an example, a magnitude of the first horizontal offset is greater than a magnitude of the second horizontal offset.

In one example, applying the at least one offset to the location associated with the key comprises applying the at least one offset to a centroid of the key. In one example, the location associated with the key comprises a first location, a location associated with gesture comprises a second location, wherein a location associated with a second key comprises a third location, the offset location associated with the key comprises a first offset location, and selecting the key as the selected key further comprises: determining, by computing device 2 and based at least in part on a comparison of the second location with the first offset location, a first distance between the second location and the first offset location, determining, by computing device 2 and based at least in part on a comparison of a third location and a second offset location, a second distance between the third location and the second offset location, and selecting, by computing device 2 and based at least in part on a determination that the first distance is less than the second distance, the key as the selected key.

In one example, applying the at least one offset to the location associated with the key comprises adjusting, by computing device 2 and based at least in part on the at least one offset, a spatial model that indicates a probability that the location is associated with the key to determine an adjusted spatial model. In such an example, the adjusted spatial model indicates a first probability that the location is associated with the key, the adjusted spatial model indicates a second probability that offset location is associated with the key, and the second probability is greater than the first probability.

In one example, the location associated with the key comprises a first location, wherein a location associated with gesture comprises a second location, and selecting the key as the selected key further comprises: determining, by computing device 2 and based at least in part on a comparison of the second location with the adjusted spatial model, a third probability that the second location is associated with the key, determining, by computing device 2 and based at least in part on a comparison of the second location with the adjusted spatial model, a fourth probability that the second location is associated with a second key, and selecting, by computing device 2 and based at least in part on a determination that the third probability is greater than the fourth probability, the key as the selected key.

In one example, determining the input posture of the gesture at the presence-sensitive input device comprises determining the input posture of the gesture based at least in part on one or more of a profile of an area of the presence-sensitive input device that detects the gesture, acceleration information from an accelerometer of the computing device, physical orientation information from a gyroscope of the computing device, and touch information from one or more touch sensors of the computing device.

In one example, the indication of the gesture detected at the presence-sensitive input device comprises an indication of a first gesture detected at the presence-sensitive input device, the selected key comprises a first selected key, and the operations further comprise: receiving, by computing device 2 and subsequent to receiving the indication of the first gesture, an indication of a second gesture detected at the presence-sensitive input device, selecting, by computing device 2 and in response to receiving the indication of the second gesture, a second key as a second selected key, and modifying, by computing device 2 and in response to selecting the second key as the second selected key, the at least one offset to the location associated with the first key to determine a modified offset location associated with the second key.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:
1. A method comprising:
outputting, by a computing device and for display, a graphical keyboard comprising a plurality of keys, wherein a first key of the plurality of keys is output for display at a particular region of a presence-sensitive input device;
receiving, by the computing device, an indication of a gesture detected at the presence-sensitive input device;
determining, by the computing device and based at least in part on a detected input posture in which a user is holding the computing device to provide the gesture to select one or more of the plurality of keys at the presence-sensitive input device, at least one of a magnitude or a direction of at least one offset;
applying, by the computing device and based at least in part on the input posture, the at least one offset to a first location associated with the first key from the plurality of keys to determine a first offset location associated with the first key;
determining, by the computing device, a first distance between the first offset location and a second location of at least a portion of the gesture;
determining, by the computing device, a second distance between a second offset location for a second key and the second location of at least the portion of the gesture; and
selecting, by the computing device, based at least in part on a determination that the first distance is less than the second distance, and while the first key is output for display at the particular region, the first key as a selected key.

2. The method of claim 1, wherein the input posture comprises at least one of a single-finger input posture, a single-thumb input posture, and a bimodal input posture.

3. The method of claim 1, wherein each of the first offset and the second offset comprise one of a horizontal offset, a vertical offset, and a combination of a horizontal offset and a vertical offset.

4. The method of claim 1,
wherein determining the input posture of the gesture at the presence-sensitive input device comprises determining a single-finger input posture,
wherein applying the at least one offset to the first location associated with the first key comprises applying a first vertical offset to the first location associated with the first key included in a first row of keys from the plurality of keys,
wherein the method further comprises applying, by the computing device, a second vertical offset to a third location associated with the second key included in a second row of keys from the plurality of keys, and
wherein a magnitude of the second vertical offset is greater than a magnitude of the first vertical offset.

5. The method of claim 4, further comprising:
applying, by the computing device, a third vertical offset to a fourth location associated with a third key included in a third row of keys from the plurality of keys, wherein a magnitude of the third vertical offset is greater than the magnitude of the second vertical offset.

6. The method of claim 5, wherein the first vertical offset, the second vertical offset, and the third vertical offset are each applied in a vertical direction from a top region of the graphical keyboard to a bottom region of the graphical keyboard with respect to an orientation of the graphical keyboard.

7. The method of claim 1,
wherein determining the input posture of the gesture at the presence-sensitive input device comprises determining a bimodal input posture,
wherein applying the at least one offset to the first location associated with the first key comprises applying a first vertical offset to the first location associated with the first key, wherein the first key is included within a center region of the graphical keyboard,
wherein the method further comprises:
  applying a second vertical offset to a third location associated with the second key included within a first outer region of the graphical keyboard; and
  applying a third vertical offset to a fourth location associated with a third key included within a second outer region of the graphical keyboard,
wherein a magnitude of the first vertical offset is greater than a magnitude of each the second vertical offset and the third vertical offset, and
wherein the center region is positioned between the first outer region and the second outer region.

8. The method of claim 1,
wherein determining the input posture of the gesture at the presence-sensitive input device comprises determining a single-thumb input posture,
wherein the method further comprises determining, by the computing device, that a profile associated with the single-thumb input posture corresponds to a right-thumb input posture,
wherein applying the at least one offset to the first location associated with the first key comprises applying a first vertical offset to the first location associated with the first key, wherein the first key is included within a right region of the graphical keyboard positioned right of a left region of the graphical keyboard with respect to an orientation of the graphical keyboard,
wherein the method further comprises applying, by the computing device, a second vertical offset to a third location associated with the second key included within a left region of the graphical keyboard, and
wherein a magnitude of the first vertical offset is greater than a magnitude of the second vertical offset.

9. The method of claim 1,
wherein determining the input posture of the gesture at the presence-sensitive input device comprises determining a single-thumb input posture,
wherein the method further comprises determining, by the computing device, that a profile associated with the single-thumb input posture corresponds to a left-thumb input posture,
wherein applying the at least one offset to the first location associated with the first key comprises applying a first vertical offset to the first location associated with the first key, wherein the first key is included within a left region of the graphical keyboard positioned left of a right region of the graphical keyboard with respect to an orientation of the graphical keyboard,
wherein the method further comprises applying, by the computing device, a second vertical offset to a third location associated with the second key included within a right region of the graphical keyboard, and
wherein a magnitude of the first vertical offset is greater than a magnitude of the second vertical offset.

10. The method of claim 1,
wherein determining the input posture of the gesture at the presence-sensitive input device comprises determining at least one of a single-finger input posture and a single-thumb input posture,
wherein applying the at least one offset to the first location associated with the first key comprises applying, based at least in part on a first distance between the first location associated with the first key and a substantially center region of the graphical keyboard positioned between a left region of the graphical keyboard and a right region of the graphical keyboard with respect to an orientation of the graphical keyboard, a first horizontal offset to first the location associated with the first key,
wherein the method further comprises applying, by the computing device and based at least in part on a second distance between a third location associated with the second key and the substantially center region of the graphical keyboard, a second horizontal offset to the third location associated with the second key, and
wherein a magnitude of the first horizontal offset is greater than a magnitude of the second horizontal offset.

11. The method of claim 10, further comprising:
determining, by the computing device, that a profile associated with the input posture of the gesture at the presence-sensitive input device corresponds to at least one of a right-finger input posture and a right-thumb input posture, wherein each of the first key and the second key are included within the left region, and wherein each of the first horizontal offset and the second horizontal offset are applied in a horizontal direction from the left region of the graphical keyboard to the right region of the graphical keyboard.

12. The method of claim 10, further comprising:
determining, by the computing device, that a profile associated with the input posture of the gesture at the presence-sensitive input device corresponds to at least one of a left-finger input posture and a left-thumb input posture, wherein each of the first key and the second key are included within the right region of the graphical keyboard, and wherein each of the first horizontal offset and the second horizontal offset are applied in a horizontal direction from the right region of the graphical keyboard to the left region of the graphical keyboard.

13. The method of claim 1, wherein determining the input posture of the gesture at the presence-sensitive input device comprises determining a bimodal input posture, wherein the first key is included within a left region of the graphical keyboard that is positioned left of a right region of the graphical keyboard with respect to an orientation of the graphical keyboard, wherein applying the at least one offset to the first location associated with the first key comprises applying a first horizontal offset to the first location associated with the first key in a horizontal direction from the right region of the graphical keyboard to the left region of the graphical keyboard, wherein the method further comprises applying, by the computing device, a second horizontal offset to a third location associated with a second key included within the right region of the graphical keyboard in a direction from left region of the graphical keyboard to the right region of the graphical keyboard, and wherein a magnitude of the first horizontal offset is greater than a magnitude of the second horizontal offset.

14. The method of claim 1, wherein applying the at least one offset to the first location associated with the first key comprises applying the at least one offset to a centroid of the first key.

15. The method of claim 1, wherein applying the at least one offset to the first location associated with the first key comprises:

adjusting, by the computing device and based at least in part on the at least one offset, a spatial model that indicates a probability that the first location is associated with the first key to determine an adjusted spatial model, wherein the adjusted spatial model indicates a first probability that the first location is associated with the first key, wherein the adjusted spatial model indicates a second probability that the first offset location is associated with the first key, and wherein the second probability is greater than the first probability.

16. The method of claim 1, wherein determining the input posture of the gesture at the presence-sensitive input device comprises determining the input posture of the gesture based at least in part on one or more of a profile of an area of the presence-sensitive input device that detects the gesture, acceleration information from an accelerometer of the computing device, physical orientation information from a gyroscope of the computing device, and touch information from one or more touch sensors of the computing device.

17. The method of claim 1, wherein the indication of the gesture detected at the presence-sensitive input device comprises an indication of a first gesture detected at the presence-sensitive input device, wherein the selected key comprises a first selected key, the method further comprising:

receiving, by the computing device and subsequent to receiving the indication of the first gesture, an indication of a second gesture detected at the presence-sensitive input device;

selecting, by the computing device and in response to receiving the indication of the second gesture, a second key as a second selected key;

modifying, by the computing device and in response to selecting the second key as the second selected key, the at least one offset to the first location associated with the first key to determine a modified offset location associated with the second key.

18. The method of claim 1, wherein a presence-sensitive display comprises the presence-sensitive input device.

19. A non-transitory computer-readable storage medium encoded with instructions that, when executed, cause at least one processor of a computing device to:

output, for display, a graphical keyboard comprising a plurality of keys, wherein a first key of the plurality of keys is output for display at a particular region of a presence-sensitive input device;

receive an indication of a gesture detected at the presence-sensitive input device;

determine, based at least in part on a detected input posture in which a user is holding the computing device to provide the gesture to select one or more of the plurality of keys at the presence-sensitive input device, at least one of a magnitude or a direction of at least one offset;

apply, based at least in part on the input posture, the at least one offset to a first location associated with the first key from the plurality of keys to determine a first offset location associated with the first key;

determine a first distance between the first offset location and a second location of at least a portion of the gesture;

determine a second distance between a second offset location for a second key and the second location of at least the portion of the gesture; and select, based at least in part on a determination that the first distance is less than the second distance and while the first key is output for display at the particular region, the first key as a selected key.

20. A device comprising:

at least one processor; and at least one module operable by the at least one processor to:

output, for display, a graphical keyboard comprising a plurality of keys, wherein a first key of the plurality of keys is output for display at a particular region of a presence-sensitive input device;

receive an indication of a gesture detected at the presence-sensitive input device;

determine, based at least in part on a detected input posture in which a user is holding the computing device to provide the gesture to select one or more of the plurality of keys at the presence-sensitive input device, at least one of a magnitude or a direction of at least one offset;

apply, based at least in part on the input posture, the at least one offset to a first location associated with the first key from the plurality of keys to determine a first offset location associated with the first key;

determine a first distance between the first offset location and a second location of at least a portion of the gesture;

determine a second distance between a second offset location for a second key and the second location of at least the portion of the gesture; and select, based at least in part on a determination that the first distance is less than the second distance and while the first key is output for display at the particular region, the first key as a selected key.

* * * * *